US008381224B2

(12) United States Patent
Huetter et al.

(10) Patent No.: US 8,381,224 B2
(45) Date of Patent: Feb. 19, 2013

(54) SOFTWARE VIRTUAL MACHINE FOR DATA INGESTION

(75) Inventors: Raymond J. Huetter, San Mateo, CA (US); Alka Yamarti, Gachibowli (IN)

(73) Assignee: uCIRRUS, San Mateo, CA (US)

( * ) Notice: Subject to any disclaimer, the term of this patent is extended or adjusted under 35 U.S.C. 154(b) by 0 days.

(21) Appl. No.: 13/525,036

(22) Filed: Jun. 15, 2012

(65) Prior Publication Data
US 2012/0324449 A1 Dec. 20, 2012

Related U.S. Application Data

(60) Provisional application No. 61/497,860, filed on Jun. 16, 2011.

(51) Int. Cl.
G06F 9/46 (2006.01)
G06F 7/00 (2006.01)
G06F 17/30 (2006.01)

(52) U.S. Cl. ........ 718/104; 718/100; 718/102; 717/148; 717/149; 717/150; 717/151; 707/607; 707/713; 707/718; 707/769; 707/774

(58) Field of Classification Search .............. 718/1–105; 717/140–151; 707/607, 705–788
See application file for complete search history.

(56) References Cited

U.S. PATENT DOCUMENTS

| | | | |
|---|---|---|---|
| 5,222,229 A | 6/1993 | Fukuda et al. | |
| 6,353,845 B1 | 3/2002 | Torzewski et al. | |
| 6,874,138 B1 | 3/2005 | Ziegler et al. | |
| 2004/0154002 A1* | 8/2004 | Ball et al. | 717/135 |
| 2005/0273571 A1 | 12/2005 | Lyon et al. | |
| 2006/0225054 A1* | 10/2006 | Sentovich et al. | 717/140 |
| 2007/0124274 A1* | 5/2007 | Barsness et al. | 707/2 |
| 2008/0201312 A1* | 8/2008 | Posner | 707/4 |
| 2009/0013325 A1 | 1/2009 | Kobayashi et al. | |
| 2009/0064156 A1 | 3/2009 | He et al. | |
| 2009/0106198 A1 | 4/2009 | Srinivasan et al. | |
| 2009/0183152 A1* | 7/2009 | Yang et al. | 718/1 |
| 2009/0327669 A1 | 12/2009 | Imada et al. | |
| 2010/0121865 A1* | 5/2010 | Vaid et al. | 707/758 |
| 2010/0131955 A1* | 5/2010 | Brent et al. | 718/103 |
| 2010/0312762 A1* | 12/2010 | Yan et al. | 707/716 |
| 2010/0333108 A1* | 12/2010 | Cypher | 718/106 |
| 2011/0047144 A1* | 2/2011 | Han et al. | 707/718 |
| 2011/0087684 A1* | 4/2011 | Junqueira et al. | 707/764 |
| 2011/0252000 A1 | 10/2011 | Diaconu et al. | |
| 2012/0117567 A1 | 5/2012 | Amano | |
| 2012/0151479 A1* | 6/2012 | Kothari | 718/1 |
| 2012/0173589 A1* | 7/2012 | Kwon et al. | 707/803 |
| 2012/0198450 A1* | 8/2012 | Yang et al. | 718/1 |

OTHER PUBLICATIONS

U.S. Appl. No. 13/524,881, by Raymond J. Huetter, filed Jun. 15, 2012.
U.S. Appl. No. 13/524,959, by Raymond J. Huetter, filed Jun. 15, 2012.
Office Action for U.S. Appl. No. 13/524,881, dated Oct. 5, 2012, 21 pp.

(Continued)

*Primary Examiner* — Abdullah Al Kawsar
(74) *Attorney, Agent, or Firm* — Shumaker & Sieffert, P.A.

(57) ABSTRACT

In general, this disclosure is directed to a software virtual machine that provides high-performance transactional data acceleration optimized for multi-core computing platforms. The virtual machine utilizes an underlying parallelization engine that seeks to maximize the efficiencies of multi-core computing platforms to provide a highly scalable, high performance (lowest latency), virtual machine. In some embodiments, the virtual machine may be viewed as an in-memory virtual machine with an ability in its operational state to self organize and self seek, in real time, available memory work boundaries to automatically optimize maximum available throughput for data processing acceleration and content delivery of massive amounts of data.

16 Claims, 13 Drawing Sheets

OTHER PUBLICATIONS

Office Action for U.S. Appl. No. 13/524,959, dated Oct. 12, 2012, 22 pp.

Zhou et al., "CloudTPS: Scalable Transactions for Web Applications in the Cloud", IEEE Transactions services computing, Special Issue on Cloud Computing, Apr. 5, 2011, pp. 1-16.

International Search Report and Written Opinion of international application No. PCT/US2012/042807, dated Nov. 5, 2012, 11 pp.

Response to Office Action dated Oct. 5, 2012, from U.S. Appl. No. 13/524,881, filed Jan. 4, 2013, 19 pp.

\* cited by examiner

SOFTWARE VIRTUAL MACHINE FOR DATA INGESTION

PRIORITY CLAIM

This application claims the benefit of U.S. Provisional Application No. 61/497,860, filed Jun. 16, 2011, the entire content of which is incorporated herein by reference.

TECHNICAL FIELD

The invention relates to computing systems.

BACKGROUND

Explosive growth in global data volume, ubiquity of devices connecting to networks, lower barriers of entry for user content creation and sharing, digitization of many formerly offline functions (banking, medical prescriptions, etc.), emergence of virtualized and offsite networked systems (clouds), among other factors, have contributed to the emergence of the "Big Data" era. This presents challenges for systems, as applications processing faces extreme massive volume throughput and requirements to deliver or distribute processed data to any number of destination points. These systems additionally must be scalable to keep pace with the continuing growth of Big Data and enable interactivity for pervasive, large audience Internet and cloud applications.

The utilization of multi-core processors has increased dramatically in the computing industries. In general, the term "processor" refers to the unit of hardware that reads and executes program instructions. Historically, processors originally utilized a single "core," which refers to the portion of the processor that reads and executes a sequence of instructions. A multi-core processor refers to a single hardware unit in which two or more independent processing "cores" are integrated onto a single package. Recently, computing systems having upwards of 128 to 256 processing cores have become available. Such multi-core computing platforms present challenges over traditional programming techniques.

SUMMARY

In general, this disclosure is directed to a software virtual machine that provides high-performance transactional data acceleration optimized for multi-core computing platforms. The virtual machine utilizes an underlying parallelization engine that seeks to maximize the efficiencies of multi-core computing platforms to provide a highly scalable, high performance (lowest latency) virtual machine.

In some embodiments, the underlying parallelization engine of the software virtual machine provides self-organization in its ability to parallelize and store relevant data for transaction processing to data partitions each associated with different execution units for the software virtual machine. In addition, tasks collectively processing transactions and corresponding transactional data provide self-tuning in their ability to autonomously determine and migrate among execution units that process the tasks. As a result, the software virtual machine may employ multiple distributed transaction delegation units and so avoid both a centralized transaction administrator to manage data organization and transactional delegation and the inherent bottlenecks associated with such centralized administration.

These techniques may be useful in systems required to address the particular needs of dynamic and interactive data acceleration for large audience web applications and "Big Data" clouds. In particular, a system that implements the described techniques can aggregate transactional data to effectively manage ingestion of massive data emanating from manifold sources and received by the system as well as disaggregate transactional data to deliver processed data to select destinations. For example, a unique data communications feature is the platform's ability to push interactively push broadcast selected data to individual devices (users) and create interactive private broadcast sessions (channels) within a homogenous mass broadcast data stream. The platform techniques may also enable customer-provided transaction and messaging application acceleration in a system operating a scalable, in-memory database cache with integrated on-demand, real-time indefinite run-time extension to secondary storage. Such a system may leverage platform techniques for scaling out the cache beyond physical in-memory boundaries and, when required, integrate as part of the virtual machine memory boundaries an automatic extension and use of physically external memory devices (e.g., hard drives). The software virtual machine described herein, in other words, supports a move from 'static information architectures' that have difficulty supporting or creating value from Big Data to a dynamic architecture model. With low latency, scalable processing in conjunction with reduced complexity and increased cost effectiveness, the described techniques specifically address the conditions of Big Data processing to provide the ability to concurrently consume and process massive transaction volumes from large numbers of data producers along with the ability to push processed data to billions of data consumers in an interactive manner.

In one example, a device comprises a multi-core hardware processor having a plurality of execution cores. The device further comprises an in-memory database comprising data stored within a plurality of memory partitions, wherein each of the memory partitions is associated with a different one of the execution cores. The device also comprises a data ingest engine that establishes a plurality of concurrent network connections to external devices to receive incoming transactions. The device further comprises a parallelization engine that decomposes incoming transactions for the in-memory database into sub-transactions, deploys the sub-transactions to the execution cores associated with the respective memory partitions that store data for the sub-transactions, and concurrently executes the sub-transactions of the incoming transactions on the respective execution cores to which the sub-transactions are deployed.

In another example, a method comprises establishing a plurality of concurrent network connections to external devices with a data ingest engine. The method also comprises receiving incoming transactions with the data ingest engine by the concurrent network connections. The method further comprises decomposing, with a parallelization engine executing on a multi-core hardware processor having a plurality of execution cores, incoming transactions for an in-memory database into sub-transactions, wherein the in-memory database comprises data stored within a plurality of memory partitions, wherein each of the memory partitions is associated with a different one of the execution cores. The method also comprises deploying, with the parallelization engine, the sub-transactions to the execution cores associated with respective memory partitions that store data for the sub-transactions. The method further comprises concurrently executing the sub-transactions of the incoming transactions on the respective execution cores to which the sub-transactions are deployed.

In another example, a computer-readable storage device comprises instructions that, when executed, cause a multicore hardware processor having a plurality of execution cores to establish a plurality of concurrent network connections to external devices with a data ingest engine. The instructions, when executed, also cause the multi-core hardware processor to receive incoming transactions with the data ingest engine by the concurrent network connections. The instructions, when executed, further cause the multi-core hardware processor to decompose, with a parallelization engine, incoming transactions for an in-memory database into sub-transactions, wherein the in-memory database comprises data stored within a plurality of memory partitions, wherein each of the memory partitions is associated with a different one of the execution cores. The instructions, when executed, also cause the multi-core hardware processor to deploy, with the parallelization engine, the sub-transactions to the execution cores associated with respective memory partitions that store data for the sub-transactions. The instructions, when executed, further cause the multi-core hardware processor to concurrently execute the sub-transactions of the incoming transactions on the respective execution cores to which the sub-transactions are deployed.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
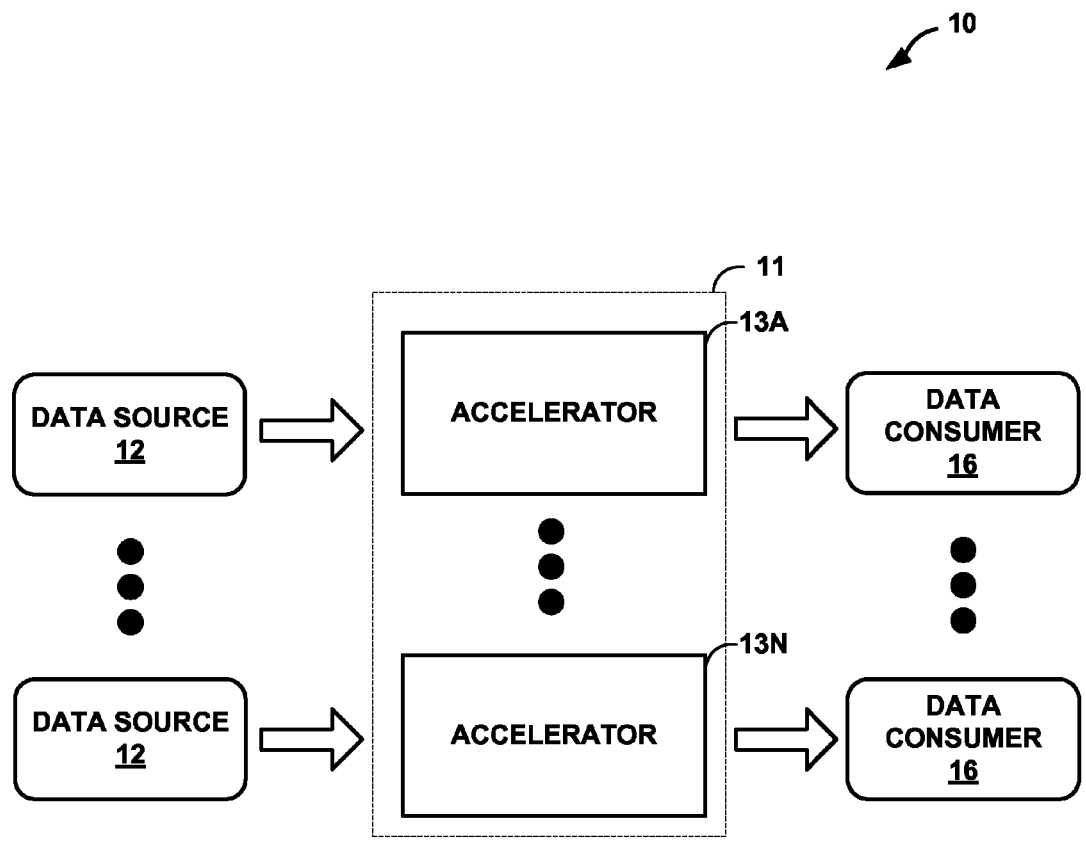
FIG. 1 is a block diagram illustrating an example system that utilizes the techniques described herein to provide high-performance transactional data acceleration.

FIG. 1 is a block diagram illustrating an example system that utilizes the techniques described herein to provide high-performance transactional data acceleration. In the example system 10 of FIG. 1, a set of transactional data accelerators 13A-13N (collectively, "transactional data accelerators 13") are organized to form a cluster 11 of data accelerators. Transactional data accelerators operate to continuously ingest and process large amounts of data transactions from data sources 12 and deliver the processed data to data sources 16. Data sources 12 and data consumer 16 may be anything that source or consume data, such as systems, applications, or databases.

As described herein, each of transactional data accelerators 13 includes a parallelization engine that provides a massively parallel multi-core operating environment for a virtual machine for ingesting and transactionally processing the ingested data. The software virtual machine provides high-performance transactional data acceleration optimized for the underlying multi-core computing platforms of transactional data accelerators 13. That is, the parallelization engine provides a base platform on which data ingestion and processing can be parallelized in a manner that is highly-scalable and optimized for independent execution across an arbitrary number of execution cores of multiple, clustered computing devices. Incoming data transactions received from data sources 12 are decomposed by the parallelization engines into operations that can execute independently on the individual cores of the underlying multi-core computing platforms of transactional data accelerators 13. The virtual machines operate on an in-memory database organized in a manner that allows the parallelization engine of each of the accelerators to execute transactional operations for inserting, deleting, updating and querying data from the in-memory database in parallel across the cores of the underlying multi-core processing environment.

Moreover, during operation, the parallelization engine of the software virtual machine executing on each of transactional data accelerators 13 may dynamically self-organize memory usage to scale the in-memory database beyond the physical in-memory boundaries. In this way, the software virtual machines of transactional data accelerators 13 may provide an automatic extension and use of physically external memory devices (e.g., hard drives) when processing the ingested transaction data. This allows the virtual machines to dynamically leverage virtual storage for the in-memory database as needed with the continuous processing of the inbound transactions in parallel on the multi-core computing environment.

Further, the virtual machines executed by transactional data accelerators 13 include parallelized communication features that allow the transactional data accelerators to interactively push selected data to data consumers 16. For example, data consumers 16 may be individual devices, and the parallelized communication features of transactional data accelerators 13 may create interactive channels within a mass broadcast data stream to push large amounts of individually requested data to high volumes on data consumers 16.

In this way, transactional data accelerators 13 execute virtual machines having underlying parallelization engines that seek to maximize the efficiencies of multi-core computing platforms to provide highly scalable, high performance (lowest latency) data transaction acceleration. Moreover, the virtual machine may be viewed as an in-memory virtual machine with an ability to self-organize in its operational state and self-seek, in real time, available memory work boundaries to automatically optimize maximum available throughput for data processing acceleration and content delivery of massive amounts of data.

The parallelized virtual machines described herein allow transactional data from data sources 12 to be dynamically acted upon in-flight then directed to data consumers 16 for further processing operations or presentation to users in the most appropriate and usable form. In addition, the parallelized virtual machines of transactional data accelerators 13 may operate on the data stream in real-time without necessarily requiring the data to be written to disk and acted on in its entirety. As such, the parallelized virtual machines may accelerate the processing speed and relevancy of transactional data presented to data consumers 16.

The parallel processing virtual machines of software accelerators 13 may be used to augment existing data processing infrastructures and applications in cloud, mobile, social and enterprise computing environments to deliver low-latency, highly scalable data acceleration with performance increase and operating cost reduction.

Figure 2:
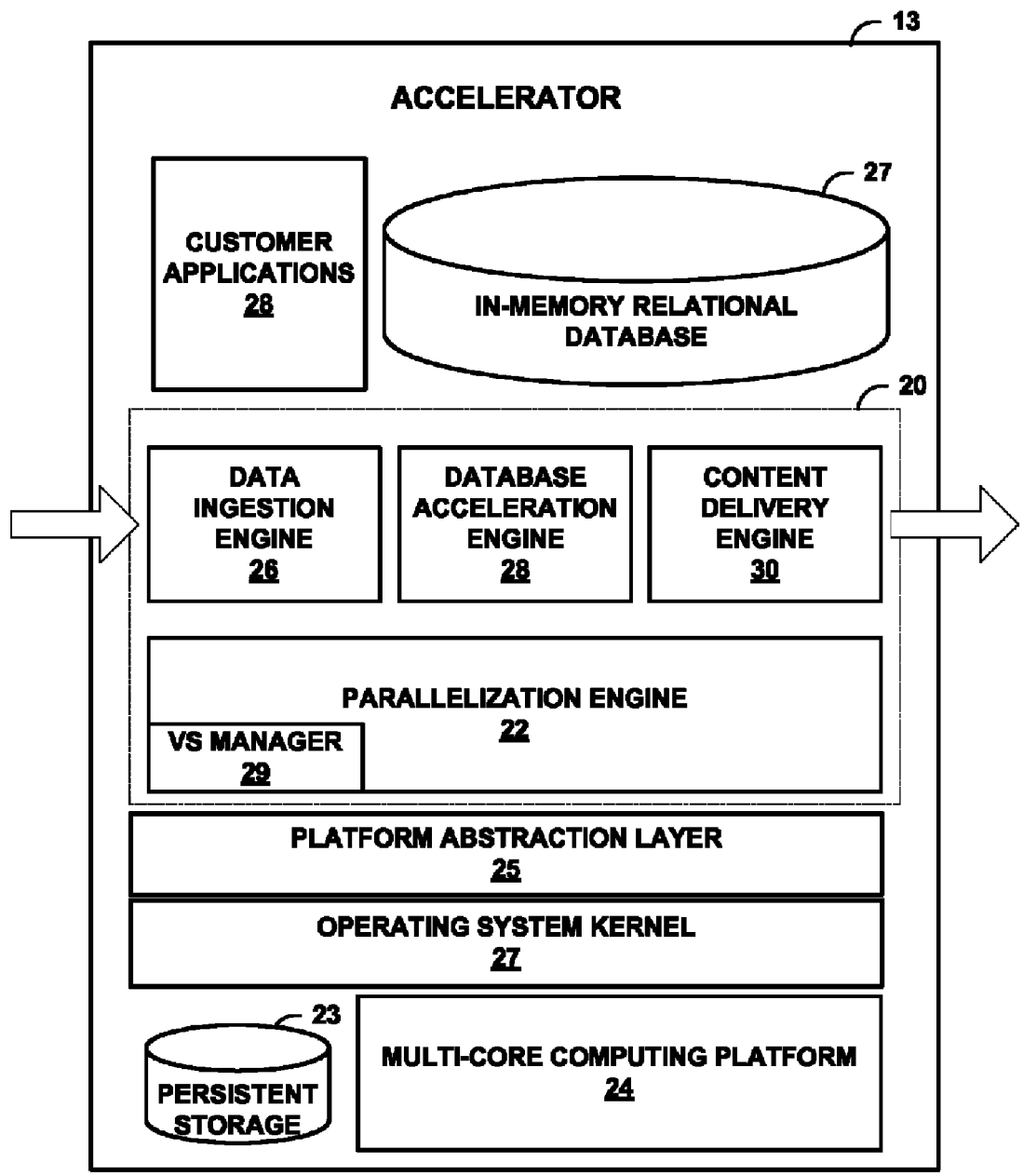
FIG. 2 is a block diagram illustrating an example embodiment of a transactional data accelerator that provides high-performance transactional data acceleration in accordance with techniques described in this disclosure.

FIG. 2 is a block diagram illustrating an example embodiment of an accelerator 13. In the illustrated example, accelerator 13 includes a virtual machine 20 is specifically designed to accelerate and provide customizable processing to large quantities of data from one to many data sources 12. Accelerator 13 is typically implemented on a computing platform, such as a high-end server, having a multi-core computing platform 24. Computing platform 24 may include any number of processors and any number of hardware cores from, for example, four to thousands.

In the example of FIG. 2, accelerator 13 includes a platform abstraction layer 25 that presents certain functionality of underlying operating system kernel 27 to virtual processor 20, such as memory management and hardware I/O. In one example, virtual processor 20 may execute within an overall process space provided by operating system kernel 27. Operating system kernel 27 may be, for example, a Linux, Berkeley Software Distribution (BSD), another Unix-variant kernel, or a Windows operating system kernel, available from Microsoft Corp.

Data ingest engine 26 of virtual processor 20 operates to "ingest" incoming transactional data. Data ingest engine 26 may receive data from thousands to millions of concurrent inbound connections, each streaming data inwards without needing to be prompted for new information. Data can be ingested from a few "fat" pipes or over thousands of connections from individual devices or sensors. Data types to be processed can be structured, unstructured or both. For example, data ingest engine 26 may include one or more data adaptors to receive and process formatted data, e.g., XML and CSV formatted data As incoming data is "ingested" into the system by data ingest engine 26, database acceleration engine 28 operates on in-memory database 27. Database acceleration engine 28 provide a highly scalable data processing engine that has primary responsibility for coordination of activities between data ingest engine 26, customer applications 28, and content delivery engine 30. In some examples, database acceleration engine 28 exposes a standard SQL-based API by which data ingest engine 26, customer applications 28, and content delivery engine 30 interact with in-memory database 27 and execute under the control of parallelization engine 22 such that extremely low latency processing occurs. In other words, the database acceleration engine 28 may provide a SQL-accessible, in-flight view at incoming data as is ingested and stored within in-memory database 27. In general, database acceleration engine 28 utilizes the parallelization engine 22 to decompose incoming transactions or events into fine-grained blocks of operations that are then deployed to the closest and most available hardware execution core relevant to the data required for processing. The database acceleration engine 28 enables the decomposition, processing, concurrency checks, and re-assembly of transactions and events into computed results.

Content delivery engine 30 may output data to one, several, or many destinations, i.e., data consumers 16. That is, content delivery engine 30 provides the ability for processed data to be 'pushed' (delivered) from in-memory database 20 as a targeted data stream to data consumers 16, which may be other systems, applications, or databases. For example, in some embodiments, content delivery engine may be configured to deliver data via a single targeted stream to another computing system or data warehouse. In addition, content delivery engine 30 may provide an interactive, bidirectional data delivery and communications engine to interactively and bi-directionally broadcast data to large audiences or devices, i.e., data consumers 16.

In some embodiments, data ingest engine 26 and content delivery engine 30 may support "select-cast" capabilities described herein that enable either a data source 12 or a data consumer 16 (or both) to tailor the content that is sent or received. This may take the form of private data channels, i.e., interactive and personalized data streams unique to each source or consumer. Each connection may be a continuous, open connection such that data consumers 16 need not poll for changed data. Data ingest engine 26 and content delivery engine may supports millions of open continuous connections to data sources 12 and data consumers 16.

Parallelization engine 22 of virtual processor 20 provides an abstracted execution environment that utilizes multicore processors and motherboard architectures to form a highly integrated, low latency, scalable, parallel platform for execution of data ingest engine 26, database acceleration engine 28, virtual storage manager 29, and content delivery engine 30. That is, parallelization engine 22 provides an execution platform optimized for multi-core and many-core systems to provide real time concurrency, memory management and task management capabilities with fine-grained parallelism on a per-core basis. Further, parallelization engine 22 ensures optimal use of instruction and data caches (e.g., L1, L2 and L3 caches) while implementing fine-grained parallelism by decomposing all processing into tasks that can independently execute on individual cores and by minimizing the requirement for concurrent locking structures. This allows data ingest engine 26, database acceleration engine 28, virtual storage manager 29, and content delivery engine 30 to operate within virtual machine 20 with a high degree of parallel execution on multi-core computing platform 24. In this way, parallelization engine 22 may be viewed as a massively parallel multi-core operating system that provides a virtual processor (virtual machine 20) for processing the ingested data.

Virtual storage manager 29 of the software virtual machine 20 provides self-organization and allows the virtual machine to scale out beyond physical in-memory boundaries and, when required, integrate the use of physically external memory devices (e.g., hard drives). This allows in-memory database 27 to spool out to external memory while performing the transactions to expand its memory space to utilize persistent storage 23. For example, virtual storage manager 29 may temporarily spool transactional data if the data to does not fit within the physical memory boundaries and push data out for storage and computation. Moreover, all of these services for virtual storage management are parallelized within virtual machine 20 an executed by parallelization engine for execution on multi-core computing platform 24.

In addition, virtual storage manager 29 manages the persistent storage 23 to allow for recovery from a failure or for users to shut down the system and bring it back up with no associated data loss. The disk persistence implementation guarantees no transaction loss in the event of a failure. As explained in further detail below, copies of in-memory database 27 may be written to checkpoint files on a configurable time interval. Further, in some cases, transactions may be recorded in journal files and transaction commits only occur after entries are written to the journal files. To recover from a system failure, the persistence subsystem of virtual storage manager 29 may apply the latest checkpoint file and then apply all journal entries since the last checkpoint to recreate in-memory database 27. In this way, persistence may be implemented to be ACID (atomicity, consistency, isolation, durability) compliant.

Figure 3:
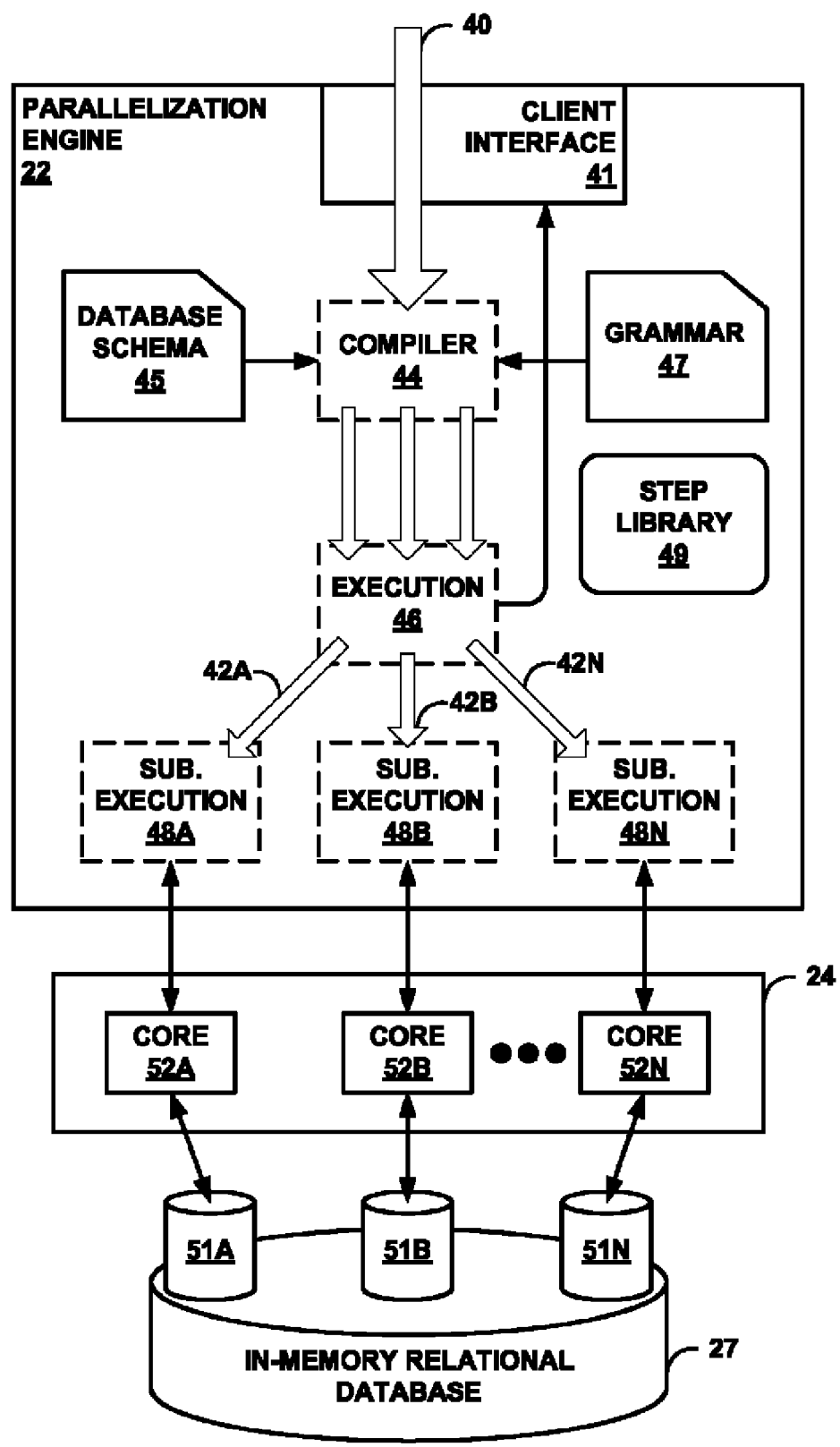
FIG. 3 is a block diagram illustrating an example instance of a parallelization engine that decomposes incoming transactions or events for processing by autonomous tasks each independently executing on a separate core of a multi-core computing platform in the manner described in this disclosure.

FIG. 3 is a block diagram illustrating an example instance of parallelization engine 22 of FIG. 2, which decomposes incoming transactions or events for processing by autonomous tasks each independently executing on a separate core of an example instance of multi-core computing platform 24 in the manner described herein. In this example, multi-core computing platform 24 includes processing cores 52A-52N ("cores 52") that each includes an independent execution unit to perform instructions that conform to an instruction set architecture for the core. Cores 52 represent an arbitrary natural number of cores and each core is associated with an index. For example, core 52A may be associated with index 1, core 52B with index 2, and so on. In one example, cores 52 represent 256 cores (i.e., N=256). Cores 52 may each be implemented as separate integrated circuits (ICs) or may be combined within one or more multi-core processors (or "many-core" processors) that are each implemented using a single IC (i.e., a chip multiprocessor).

Subsets of cores 52 combined in a multi-core processor may share processor components while each core of the subset maintains at least an independent execution unit to perform instructions substantially independently of the other cores of the subset. For example, cores 52A, 52B may share a level 3 (L3) cache and a memory management unit (MMU) for a multi-core processor that includes the cores. However, cores 52A, 52B in this example each include a separate execution unit and separate level 1 (L1)/level 2 (L2) caches. Alternatively, cores 52A, 52B may share L2/L3 caches and an MMU of the multi-core processor. In some instances, multi-core computing platform 24 may represent a cluster of separate motherboards or processing blades (hereinafter, "cluster machines") inserted within one or more chassis. Each cluster machine in such instances may include one or more multi-core processors each having a subset of cores 52.

Data of in-memory relational database 27 is stored in one or more computer-readable storage media that includes partitions 51A-51N ("partitions 51") each located in a separate physical location and each associated with a respective one of cores 52. The computer-readable storage media that store in-memory relational database may present a non-uniform memory access (NUMA) architecture. That is, cores 52 may not have equal memory access time to each of partitions 51. In some instances, each of partitions 51 associated with respective cores 52 represent the partition of in-memory relational database 27 having a memory access time that is less than or equal to the memory access time to any other one of the partitions for the core. In other words, cores 52 may use respective partitions 51 that offer the lowest memory latency for the cores to reduce overall memory latency.

Each of partitions 51 comprises computer-readable storage media, such as non-transitory computer-readable mediums including a memory such as random-access memory (RAM) (including various forms of dynamic RAM (DRAM), e.g., DDR2 SDRAM, or static RAM (SRAM)), Flash memory, content-addressable memory (CAM), ternary CAM (TCAM), or another form of fixed or removable storage medium that can be used to carry or store desired instructions and in-memory relational database 27 data and that can be accessed by cores 52.

In some instances, partitions 51 may each represent partitions of a physical address space for a computer-readable storage medium that is shared among one or more cores 52 (i.e., a shared memory). For example, cores 52A may be connected via a memory bus (not shown) to one or more DRAM packages, modules, and/or chips (also not shown) that present a physical address space accessible by the multi-core processor and storing data for partition 51A. While partition 51A may offer the lowest memory access time to core 52A of any of partitions 51, one or more of other partitions 51 may be directly accessible to core 52A. In some instances, partitions 51 may also, or alternatively, each represent a cache of corresponding cores 52. For example, partition 51A may comprise an on-chip cache (e.g., an L1/L2/L3 cache or a combination thereof) for core 52A.

Partitions 51 store non-overlapping portions of decentralized database objects for in-memory relational database 27. Such objects may include relational tables or indexes stored and managed using underlying data structures such as trees (or "tries") of data objects, flat files, heaps, hash buckets, and B+ trees, for instance. As described in detail below, parallelization engine 22 apportions a separate underlying data structure for respective database objects to each of partitions 51 and also assigns data to be managed by the underlying data structures for database objects to different one of partitions 51, effectively parallelizing the database objects among the partitions. Because each of cores 52 reads and writes from a different one of partitions 51, partitions 51 are not subject to corruption due to concurrent operation of multiple cores 52. As a result, tasks executing on cores 52 may eschew locking partitions 51 in many circumstances.

Client interface 41 of parallelization engine 22 presents an interface by which clients may issue requests to accelerator 13. In some aspects, client interface 41 implements transport layer (e.g., Transmission Control Protocol (TCP)/Internet Protocol (IP) or User Datagram Protocol (UDP)/IP) sockets to receive and return data from/to clients that invoke the interface.

Parallelization engine 22 decomposes incoming transaction 40 into fine-grained, sub-transactions 42A-42N ("sub-transactions 42") and distributes the sub-transactions to multiple execution tasks that run on the one of cores 52 that is logically associated with the one of partitions 51 relevant to the data for the respective sub-transactions 42. In some cases, the relevant one of partitions 51 is the partition that stores data to be returned in a query-type transaction 40. In some cases, the relevant one of partitions 51 is the partition that stores, for a database index object, an underlying data structure that is to store the data for an insert-type transaction 40 that references the database index object.

Parallelization engine 22 may automatically determine a number of cores 52 of accelerator 13 without requiring software configuration by an administrator. Upon a determination of the number of cores 52, parallelization engine creates a corresponding one of partitions 51 for each of cores 52. This feature may allow for parallel deployment to an arbitrary number of cores 52, again, without requiring reconfiguration of the underlying software.

Transaction 40 is a transaction unit, that is, a self-contained work unit received and performed by accelerator 13 to alter a state of in-memory relational database 27. Transaction 40 may be ACID-compliant in order to provide isolation between the transactions for concurrent execution and to provide for rollback in the event of failure. Transaction 40 may include a request string that conforms, for example, to a declarative language statement, a query language or query programming language program, a functional programming language program, or a rule language program that specifies the respective work unit to be performed by accelerator 13. Transaction 40 contains one or more subunits of work that may be performed by an independent execution unit as individual sub-transactions 42 of the atomic, parent transaction 40. Sub-transactions 42 may include, with respect to in-memory relational database 27; reading, writing, manipulating, and deleting data; creating and managing database objects; creating and managing metadata; and arithmetic and string manipulation operations.

Compiler task 44 ("compiler 44") receives transaction 40 and decomposes the transactions to sub-transactions 42 using transaction grammar 47 ("grammar 47"), which describes the particular language of incoming transactions, including transaction 40, in combination with database schema 45 for in-memory relational database 27 and step library 49. In one example, grammar 47 includes a set of one or more substitution rules each having variables to match data in database schema 45 describing the organization of in-memory relational database 27. Database schema 45 may comprise a data dictionary. Each of the substitution rules of grammar 47 references variables for additional substitution rules in grammar 47 or steps in step library 49. Compiler 44 parses transaction 40 to generate tokenized request strings, and then compiler 44 applies grammar 47 to each tokenized request string in view of database schema 45 to yield, for the transaction, one or more series of steps stored by step library 49. Each series of steps constitutes a separate task that, when executed in series by an execution task, performs one of sub-transactions 42. In this way, compiler 44 decomposes transaction 40 to sub-transactions 42 for distribution to and execution by multiple cores 52.

Step library 49 comprises a dictionary that maps groups of step instructions executable by cores 52 to step keys referenced by grammar 47. Each group of step instructions may include pre-compiled machine-executable instructions for cores 52. To execute a series of steps (i.e., a task) each identified by a step key, an execution unit maps the step keys for the steps to step library 49 to obtain the corresponding mapped step instructions, then executes the mapped step instructions on a step-by-step basis. Each of tasks 44, 46, and subordinate execution tasks 48A-48N (illustrated as "sub. execution" 48A-48N) represent respective series of steps for corresponding sub-transactions 42.

Having decomposed transaction 40 into sub-transactions 42, compiler 44 spawns execution task 46 to manage the execution of the sub-transactions and return any required response for transaction 40. In this way, compiler 44 generates an execution plan and spawns execution task 46 to perform the execution plan. Execution task 46 spawns subordinate execution tasks 48 to execute corresponding sub-transactions 42. In some cases, transaction 40 may represent multiple separate database transactions. In such cases, compiler 44 may spawn a separate execution task to manage each transaction or reuse execution task 46 to manage the transactions.

Sub-transactions 42 may each relate to different data stored by in-memory relational database 27 in separate partitions 51. For example, transaction 40 may comprise a query request for rows of a database table having field values that match multiple criteria, e.g., a SELECT SQL statement with a WHERE clause, where the database table has a corresponding index defined for the field. As another example, transaction 40 may comprise a request to add a row to a database table having multiple indices defined, e.g., an INSERT SQL statement, or to update with a new field value all rows of the database table that match one or more criteria, e.g., an UPDATE SQL statement. As another example, transaction 40 may comprise a request to return a sum of all values for a row field of a database table. Execution task 46 spawns subordinate execution tasks 48 for sub-transactions 42 and assigns the tasks to different cores 52 based on the related data. Execution task 46 may provide a memory pointer to itself to enable subordinate execution tasks 48 to return resulting data or status information. Any of subordinate execution tasks 48 may in turn spawn additional subordinate execution tasks in a recursive decomposition of sub-transactions 42.

Execution task 46 inputs data for a sub-transaction 42 to an assignment algorithm, such as a hash function, that outputs an index or other identifier that identifies one of cores 52. For the request to add a row example, above, execution task 46 may input to the assignment algorithm the complete row data or a subset of the row data, such as the row data for fields for which indices are defined for the database table. The assignment algorithm may be, for example, an MD5, SHA-1, or a bitwise operation applied to the input data and modulo the number of cores 52, or any other another function that produces a value within a range of the number of cores when provided arbitrary input data. For the query request and update statement examples, above, execution task 46 may hash the criteria for the query request and then calculate the hash output modulo the number of cores. The core index output by the assignment algorithm, provided database object data for sub-transactions 42, determines the execution one of cores 52 of respective subordinate execution tasks 48 for the sub-transactions when spawned by execution task 46. In the illustrated example, core 52A having index 1 executes sub-transaction 42A because data related to sub-transaction 42A causes the assignment algorithm to output index 1. Core 52B having index 2 executes sub-transactions 42B because data related to sub-transaction 42B causes the assignment algorithm to output index 2, and so on. In this way, the assignment algorithm associates data with different partitions 51 and also with the cores 52 that access the respective partitions when delegated sub-transactions 48 in accordance with the assignment algorithm. For the sum of all values example, above, execution task 46 spawns one of sub-transactions 42 for each core 52. Each of the sub-transactions causes respective sub-ordinate execution tasks 48 to calculate a partial sum of data for the database table stored by the associated one of partitions 51.

Each of cores 52 operates on a different one of partitions 51. By directing subordinate execution tasks 48 to different cores 52 for execution, execution task 46 causes data related to respective sub-transactions 42 for subordinate execution tasks 48 to be stored by different, known partitions 51. In the illustrated example, because core 52B logically associated with partition 51B executes subordinate execution task 48B, partition 51B stores data related to sub-transaction 42B. The techniques therefore effectively parallelize transactions as well as assign execution tasks to cores 52 that offer a lowest memory access time to partitions 51 that store the parallelized data related to the respective execution tasks. Subordinate execution tasks 48 may migrate among cores 52 when a corresponding one of sub-transactions 42 relates to data stored by multiple partitions 51. In this way, tasks execute nearest, by memory latency, to the data required by the tasks.

Each of subordinate execution tasks 48 comprises a series of steps. To execute the steps, subordinate execution tasks 48 may map the step keys for the steps to corresponding step instructions in step library 49 and direct cores 52 to execute the step instructions. Each of subordinate execution tasks 48 executes on a different one of cores 52. Subordinate execution tasks 48 may thus execute substantially in parallel despite performing, in combination, a single transaction 40. As a result, parallelization engine 22 may achieve a substantial improvement in transaction processing speed that scales to an arbitrary number of cores 52 and the level of parallelization inherent within transaction 40. Furthermore, parallelization engine 22 achieves such parallelization in a single system with a consolidated in-memory relational database 27 that may nevertheless be accessed via multiple cores 52 of the system, rather than in a distributed system that partitions a database among multiple database servers and thus requires a separate load balancing server or controller to balance database data among the multiple partitions.

Subordinate execution tasks 48 may provide respective return values to execution task 46 referenced via a memory pointer to execution task 46 referenced with the subordinate execution tasks. Return values may include requested data, partial data (e.g., a partial sum), and execution status values (e.g., success, fail), for example. Execution task 46 generates a response string for transaction 40 using the return values and outputs the response string to one or more requesting clients via client interface 41, or execution task 46 aggregates the return values for further processing with another task within parallelization engine 22.

While described with respect to operations performed on an in-memory database, the techniques of this disclosure apply to other applications that may benefit from parallelized processing of incoming transactions. For example, transaction 40 may represent a packet data unit (PDU) having a plurality of field data that must be individually processed. This field data can be decomposed by compiler 44 into a number of sub-transactions for execution by respective sub-execution tasks 48. In some instances, transaction 40 may represent a code snippet that conforms to a programming language, such as C/C++ or Java. In such instances, compiler 44 may execute a compiler for the programming language to dynamically produce machine code for execution by sub-execution tasks 48 directly on respective cores 52 to process inbound transactions (e.g., packets). In this way, parallelization engine 22 may dynamically alter the executing program in accordance with received code snippets in order to support flexible, parallelized processing of inbound/outbound data (e.g., PDUs).

Figure 4:
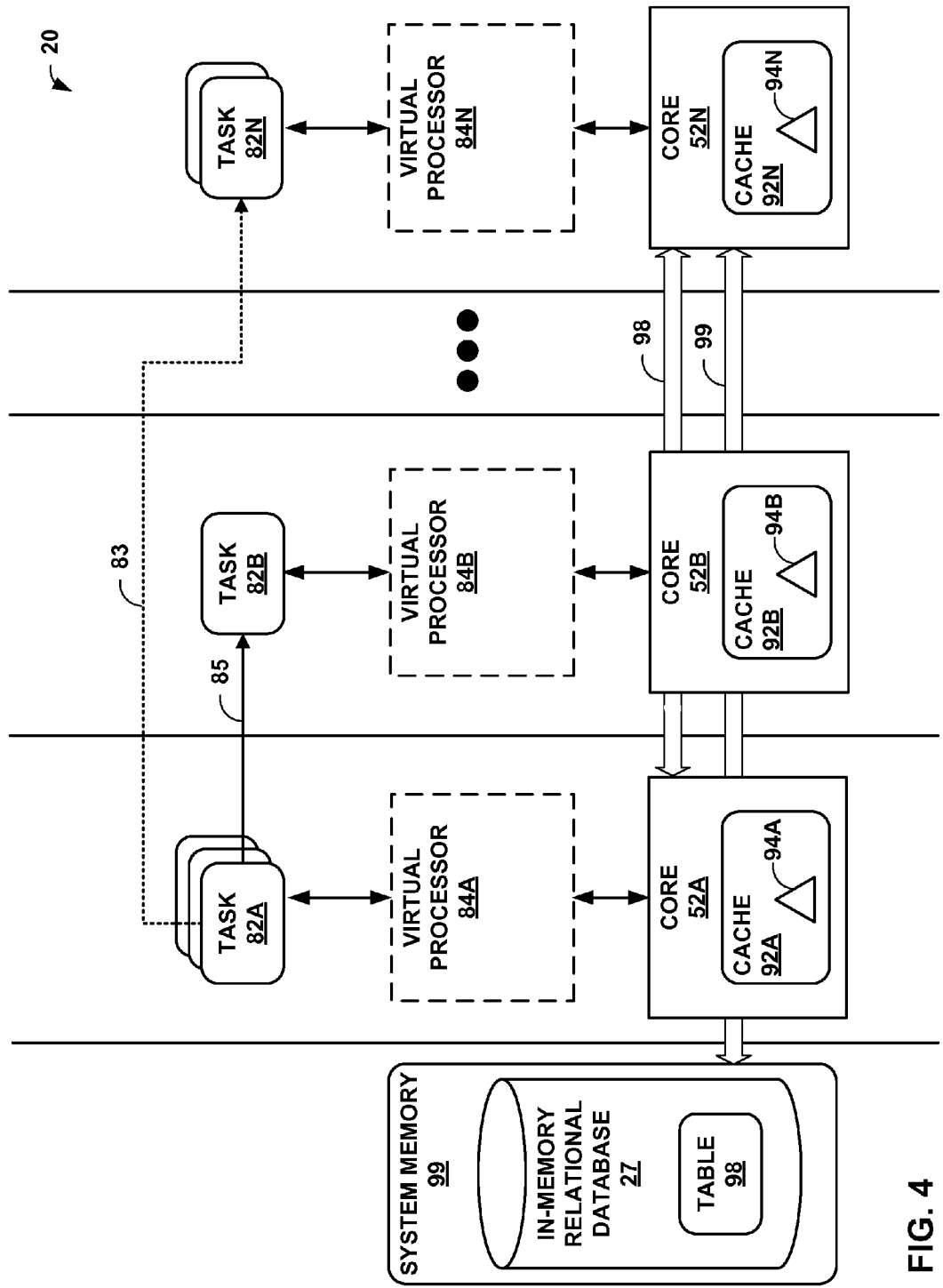
FIG. 4 is a block diagram illustrating tasks executing on virtual processors to concurrently modify cached data structures using the techniques of this disclosure.

FIG. 4 is a block diagram illustrating a conceptual view in which virtual processor 20 may be viewed as a plurality of cooperating virtual processors 84 executing on respective cores of multi-core computing platform 24. As shown in the example of FIG. 4, each of virtual processors 84 execute tasks 82 in parallel to concurrently modify cached data structures using the techniques of this disclosure and perform the various external and internal functionality of accelerator 13. Each of virtual processors 84 provide pseudo-independent operating environments for scheduling and managing execution of a corresponding set of tasks 82A-82N over respective cores of a multi-core computing platform 24.

Virtual processors 84 may offer a uniform, platform-independent execution environment for virtual processor management; task scheduling; statement compilation and execution; database transaction processing; journaling; virtual processor load balancing; database persistence, recovery, and replication; data ingestion and output; and user-defined actions. Virtual processors 84 may implement the execution environment by offering a virtual instruction set architecture (ISA) that is uniform for each of the virtual processors. The virtual processors 84 receive instructions for executing tasks and translate the instructions to kernel-level library calls and/or to instructions that conform to the native ISA provided by respective cores. In this way, virtual processors provide a set of fully parallelized virtual machines with which to execute tasks 82.

In some embodiments, a plurality of cores 52 support a single instance of a kernel and a process to provide a virtual processor 20. For example, core 52A, 52B may execute threads for a single process. In such embodiments, cores 52 that cooperate to provide a virtual processor have access to a single physical or virtual address space provided by the process. Such virtual processors may also be referred to as process virtual machines. As a result, tasks that execute on the cooperating cores can pass messages, migrate, and spawn other tasks among the cores by writing to and reading from the common address space.

Tasks 82 include a set of steps that conform to the uniform, platform-independent programming environment provided by each of virtual processors. The steps may represent an example embodiment of the steps of step library 49 described with respect to FIG. 3. That is, virtual processors 84 may translate steps to a set of instructions machine-executable by cores 52. As a result, each of tasks 82 may seamlessly migrate to and execute on any of the virtual processors 84 without requiring recompilation to a new ISA or translation to a new programming environment.

Caches 92 of respective cores 52 store data associated with the respective core and may represent example embodiments of partitions 51 of FIG. 3. Each of caches 92 includes one of partial structures 94A-94N ("partial structures 94") that cache data for a collective data structure that represents a database object, such as index 93 defined for table 98 of in-memory relational database 27. In other words, each of partial structures 94 caches a non-overlapping subset of the data for index 93. Partial structures 94 and index 93 may include tables, trees, linked lists, and B+ trees, for instance. In accordance with the techniques of this disclosure, partial structures 94 cache respective data for index 93 when the data, when input to an assignment algorithm executed by one of virtual processors 84, results in an index value associated with one of cores 52 that comprises the partial structure in its cache. Partial structures 94 may include subsets of data stored and managed by any database object that may be partitioned, including tables, indices, individual table rows, and internal structures. In addition, while illustrated as residing in caches 92, partial structures 94 may be distributed within any one or more computer-readable storage media.

For example, the collective data structure may be an index that includes field values for the database index field that each map to a pointer that resolves to a row of table 98 stored in in-memory relational database 27. In this example, each of partial structures 94 includes field value-pointer mappings assigned to the one of cores 52 that includes the partial structure. As a result, tasks 82 executing on virtual processors 84 may quickly determine the location of field value-pointer mappings among partial structures 94 for the database index by hashing field value data. In some instances, cores 52 may maintain an array or other associative data structure for index 93 that maps index values for cores 52 to memory addresses, in memory space, for corresponding partial structures 94. Upon applying the assignment algorithm to determine an index value for lookup data, tasks 82 map the index value to the memory address for one of partial structures 94 and migrate to the virtual processor 84 corresponding to the one of cores 52 associated with the index value for execution. In this way, each of cores 52 is logically associated with the data in respective partial structures 94, and the techniques may improve cache performance by increasing the probability of partial structures 94 remaining in the corresponding one of caches 92. In some instances, a dedicated task manages the associative data structure for execution tasks.

In the illustrated example, cores 52 communicate to exchange data, messages, and tasks via system bus 98. In addition, cores 52 interface to system memory 99, including in-memory relational database 27, via memory bus 99. Virtual processors 84 separately execute tasks 82 in parallel to perform the various external and internal functionality of accelerator 13. Tasks 82 may be pointers that resolve to a task structure in system memory 99 that includes a series of steps for execution by virtual processors 84. Tasks 82 may therefore be uniquely identified by their address in the system memory 99 address space. Each of tasks 82 executes substantially independently of every other one of tasks 82. While tasks 82 may exchange data with other tasks, spawn additional tasks, and be spawned from other tasks, each of tasks 82 self-determines the one of cores 52 that is to execute the task. There is no supervisory task or process to specify a core location for tasks 82. This heterarchy of cooperating tasks 82 are thus self-directed and self-organizing, substantially reducing the number of cores 52 cycles devoted to task management, consistency checking, and other administrative functions.

Tasks 82 may migrate among virtual processors 84 and spawn additional tasks to execute on other virtual processors 84. In the illustrated example, task 82A executing on virtual processor 84A spawns task 82B to execute on virtual processor 84N by sending message 83 to virtual processor 84N. Message 83 may specify a series of steps determined by task 82A for the spawned task 82B. Message 83 may alternatively specify a pointer that resolves to a task structure in system memory 99 that includes a series of steps to execute as task 82B. In addition, task 82A subsequently copies itself to execute on virtual processor 84B by sending message 85 to virtual processor 84B. Message 85 may specify a series of steps that represents a remainder of task 82A requiring execution or a pointer that resolves to a task structure in system memory 99 that includes at least a remaining series of steps for execution by virtual processor 84B.

Figure 5:
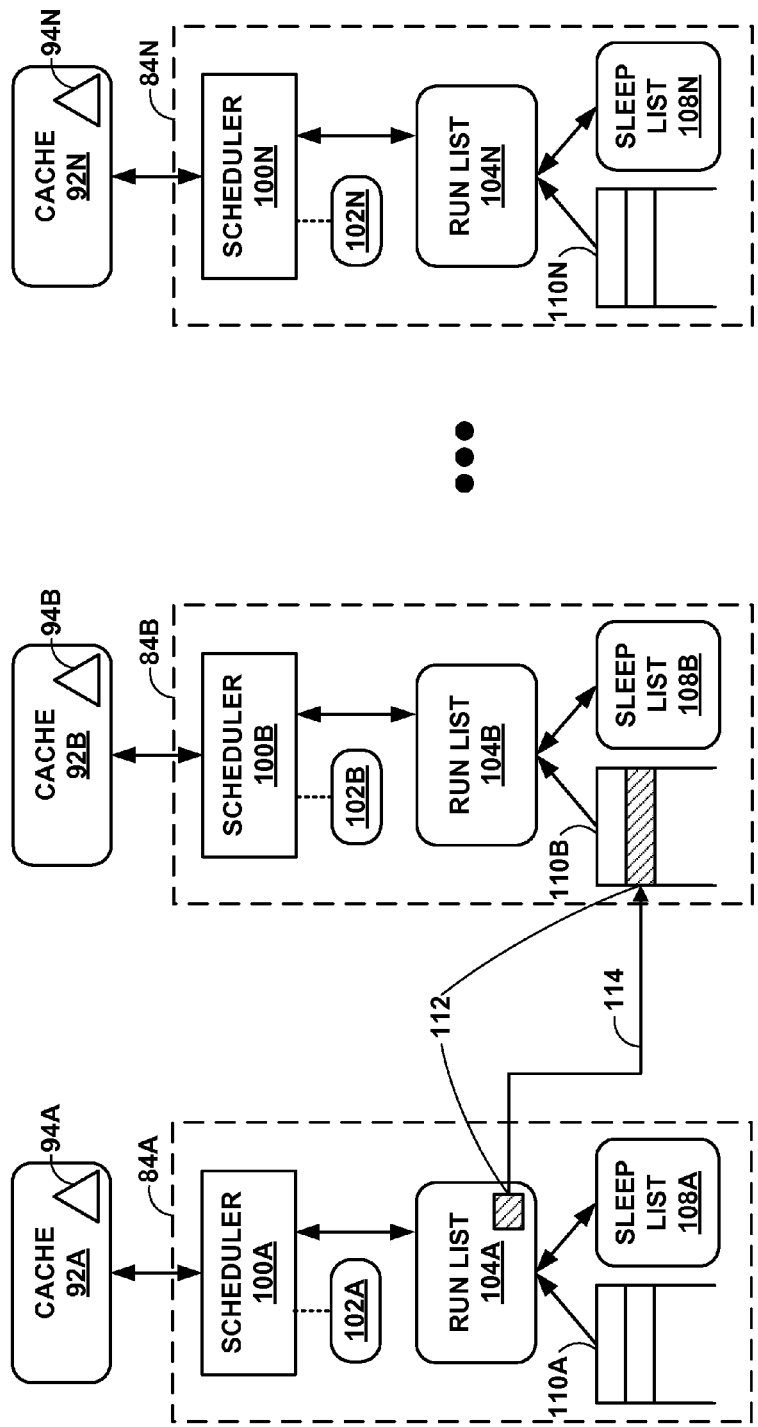
FIG. 5 is a block diagram illustrating example virtual processors in further detail.

FIG. 5 is a block diagram illustrating virtual processors 84A-84N, with additional detail, that execute multiple parallel tasks in accordance with the techniques of this disclosure. Each of virtual processors 84 is associated with one of caches 92A-92N because the virtual processor executes on a core that includes the associated cache. While components and functionality of virtual processors 84 is alternately described with respect to individual ones of the virtual processors, each of virtual processors 84 includes substantially similar components to perform substantially similar functionality. In some instances, multiple cores may execute threads for a process that provides one of virtual processors 84. In such instances, the process includes separate component sets for each of the cores. For example, a single virtual processor 84 in such instances may provide four instances of the set of a run list 104, sleep list 108, cross-queue 110, and heartbeat task 102. In such instances, scheduler 100 for the process executes on separate cores to carry out tasks 82 on the process. Reference herein to a virtual processor may therefore alternatively refer to a virtual process and one of the component sets provided therein.

Run list 104A of virtual processor 84A stores a list of tasks currently enqueued for execution by the virtual processor. In the illustrated example, run list 104A is a circular queue that stores memory pointers that resolve to respective task structures in the memory space for virtual processor 84A. Run list 104A, like other data structures that support virtual processor 84A, may be stored in cache 92A and/or in main memory. Scheduler 100A iteratively invokes tasks in run list 104A. Scheduler 100A performs time-division multiplexing with variable time divisions that depend upon instructions in tasks. Scheduler 100A may spawn separate threads to each execute one task in run list 104A. Alternatively, scheduler 100A may use a single worker thread for run list 104A. Besides threads for executing run list 104A, scheduler 100A may use additional threads to perform specialized tasks. Scheduler 100A invokes a task of run list 104A to execute for a time-division, then invokes a next task of 104A. Because run list 104A is a circular queue, scheduler 100A iteratively executes the tasks of the run list from the list head to the list tail then, upon completing executing at least a portion of the task at the list tail, again executes the task at the list head.

Tasks migrate among virtual processors 84 such that a task initially executing on one of virtual processors 84 may later execute on another virtual processor. In addition, a task executing on one of virtual processors 84 may spawn a new task for execution on another of the virtual processors. In the illustrated example, task 112 migrates from virtual processor 84A to virtual processor 84B by adding a memory pointer for itself to cross-queue 110B in message 114 that comprises, in this example, a memory-write operation. Run lists 104 of virtual processors 84 may be accessed at any time, and, with the exception of operations involving heartbeat tasks 102, virtual processors 84 run independently in parallel and do not synchronize their execution of tasks. In some instances, virtual processors 84A, 84B may execute on separate cluster machines. As a result, neither of virtual processors 84A, 84B may access the physical memory space of the other. In such instances, message 114 may include a network-based message such as a socket write, or a cross-bar, backplane, or other switch message, for example.

To prevent corruption of run lists 104 due to an asynchronous addition of a new task, virtual processors 84 include respective cross-queues 110 that temporarily store zero or more new tasks for addition to run lists 104. In operation, task 112 executing on virtual processor 84A determines that it may operate more efficiently on virtual processor 84B and migrates itself to virtual processor 84B by locking cross-queue 110B and pushing a memory pointer for task 112 to the cross-queue. To spawn a new task on virtual processor 84B, task 112 executing on virtual processor 84A may create a new task data structure in memory and then push a memory pointer to the new task data structure to cross-queue 110B.

Scheduler 100B runs within virtual processor 84B to pop the head task of cross-queue 110B and insert the popped task on run list 104B. By utilizing cross-queues 110 in this manner, virtual processors 84 may avoid locking respective run lists 104 to read/write the run lists yet avoid collisions due to concurrent task execution and migration/spawning by separate virtual processors executing in parallel. In some instances, to reduce the possibility of collisions with respect to cross-queues 110A, virtual processor 84A may include multiple cross-queues, e.g., one cross-queue per virtual processor in the system.

In some instances, task 112 may migrate to virtual processor 84B because an assignment algorithm executed by the task determines task 112 requires access to an object in partial structure 94B of cache 92B associated with virtual processor 84B. As described above with respect to FIG. 4, partial structures 94 store a subset of data for an overall database object for the in-memory relational database 27. In some instances, partial structures 94 may represent partial structures alternately or additionally stored to main memory. To avoid locking partial structures 94 during access by tasks executing on virtual processors 84, access to respective partial structures may be limited to tasks executing on the one of virtual processors 84 associated with the partial structure. Task 112 must therefore operate on virtual processor 84B to access partial structure 94B. This constraint ensures that access to partial structures 94 by tasks is safe and reliable even though the tasks eschew, in many circumstances, locking the partial structures and even though multiple different tasks may share the overall database object. Moreover, multiple tasks executing on different virtual processors 84 may access the overall database object concurrently by separately accessing different partial structures 94 that together constitute the database object. When, however, task 112 is unable to complete access to one of partial resources 94 in its allotted time division, task 112 may lock the partial resource to ensure the partial resource data remains stable and consistent for the task until its next time division. Alternatively, task 112 may lock only an item stored by one of partial structures 94, rather than the full structure. In this way, a subsequent task may modify any non-locked items of the partial structure.

In some cases, tasks of run list 104A may require resources not immediately available or otherwise be awaiting satisfaction of a dependency in order to continue execution. To avoid congesting the associated core executing virtual processor 84A, such tasks may sleep by adding themselves to sleep list 108A along with an associated wake-up time. Sleep list 108A stores sleeping tasks ordered by wake-up time in an ordered data structure, such as a queue, table, linked list, or tree data structure. Each node in sleep list 108A is thus a memory pointer to a task structure for a sleeping task.

An alarm task and a hardware timer for virtual processor 84A manage sleeping tasks in sleep list 108A. The alarm task programs the hardware timer with an awaken time value for the earliest task in sleep list 108A. When the hardware timer fires, the alarm task triggers and adds the earliest task in sleep list 108A to run list 104A. In some instances, the alarm task modifies run list 104A to ensure that scheduler 100A invokes the earliest task next among the tasks within the run list. The alarm task then reprograms the hardware timer with an awaken time value for the next earliest task according to sleep list 108A. The hardware timer may be driven with a CPU clock having a rate exceeding 1 GHz and thus has sub-microsecond periodicity. As a result, the alarm task in conjunction with the hardware timer may achieve fine-grained task sleep management and virtual processor operation behavior, and may thus enhance the utilization of resources by ensuring that tasks awaken and execute within a short latency after their associated awaken time value.

Virtual processors 84 execute respective heartbeat tasks 102A-102N ("heartbeat tasks 102") at a pre-defined rate to synchronize an operational position of the virtual processors once for every period defined by the heartbeat rate. In some instances, the pre-defined rate is 1 Hz. For example, scheduler 100A invokes tasks of run list 104A and, once per second, execute heartbeat task 102A. To synchronize the operational position of virtual processors 84, heartbeat tasks 102 may each access and decrement an atomic variable shared among all instance of the virtual processors. The atomic variable may be initialized with a number of virtual processors 84 (corresponding to the number of cores in the system). Each of heartbeat tasks 102 test the atomic variable for zero. When the atomic variable is non-zero, the heartbeat tasks waits for a signal. When the atomic variable reaches zero due the operation of the final heartbeat task for the particular cycle, the final heartbeat task may initiate one or more user-level tasks or signal each of virtual processors 84 to resume execution of their respective run lists 104. In this way, the final heartbeat task changes the phase of all tasks to the heartbeat (i.e., the time of the system-wide signal) of the final heartbeat task. Heartbeat tasks 102 therefore provide a time window in which the state of every virtual processor 84 is known. Tasks may leverage this time window to perform system-wide operations.

For example, tasks may set a task hook (e.g., a memory pointer to a task structure in memory) within each of heartbeat tasks 102. Upon receiving a signal from the final heartbeat task for a cycle, each of the heartbeat tasks waiting on the signal begins executing and executing the hooked task. The hooked task, when thus simultaneously executed by each of virtual processors 84, provides a system-wide operation. In some cases, the final heartbeat task for the cycle alone executes the hooked task. This technique may be useful for scaling out memory, performing database checkpoint write and read operations or other periodic tasks such as database journaling, logging, and archiving. Tasks may wait and signal one another using monitors, shared memory, or semaphores, for example.

Some tasks within run lists 104 do not related to data within caches 92 (or another memory partition) and therefore may run on any of virtual processors 84. Such tasks may include a flag in the task structure that indicate the task is moveable. Tasks may self-modify the flag after each step to indicate whether a next step for the task must be executed on a particular one of virtual processors 84.

To improve utilization and reduce congestion of virtual processors 84, tasks self-balance to more equally distribute a number of tasks for each of run lists 104 and, thus, for each of virtual processors 84. In some instances, after performing each step of a task, a task determines the length of respective run list 104 and lengths of neighboring run lists 104. For example, a task may determine a length of (i.e., a number of tasks stored by) run list 104B and lengths of run lists 104A, 104C after executing a step of a task. If the task determines the length of run list 104B exceeds the length of either of run lists 104A, 104C by a threshold value, the task migrates itself, if moveable, to the shorter of run lists 104A, 104C. In some instances, tasks account for even more remote neighbors, that is, not just nearest neighbors, when performing rebalancing. In this way, tasks autonomously self-organize in a balanced manner by migrating themselves toward lightly loaded virtual processors 84 (and corresponding cores). Tasks may determine lengths of neighboring runs lists by exchange the lengths in message or reading a shared memory value, for example.

Figure 6:
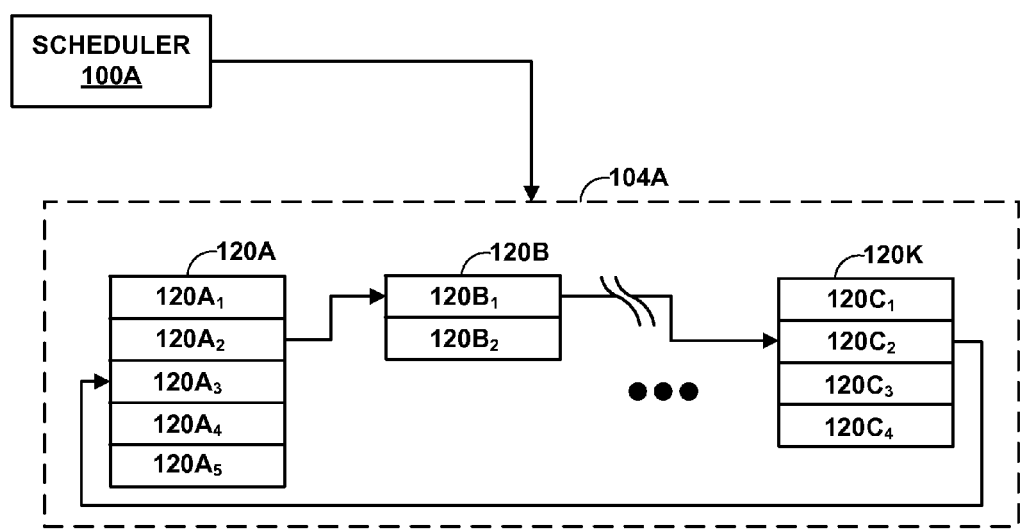
FIG. 6 is a block diagram of a system that performs time-division multiplexing of tasks in accordance with techniques described herein.

FIG. 6 is a block diagram illustrating scheduler 100A invoking multiple tasks 120A-120K ("tasks 120") of run list 104A to perform time-division multiplexing of tasks in accordance with techniques described in this disclosure. Run list 104A in this example is implemented and illustrated as a circular linked list. Accordingly, task 120A is the head task of run list 104A is succeeded by task 120B. Task 120K is the tail task of run list 104A and is succeeded by task 120A. Each of tasks 120 includes a list of one or more steps for execution. For example, task 120A lists steps $120A_1$-$120A_5$. A step is a self-contained block of one or more instructions, such as a function or function reference, for execution by virtual processor 84. A step may invoke, as an element of execution, other functions defined by programs executing on the system.

Steps of tasks 120 may include variable numbers and types of instructions and thus have different execution lengths. In other words, the time required to execute each of the steps of tasks 120 can differ from step to step. Steps of tasks 120 execute atomically, i.e., from the first instruction of the step to the last instruction of the step without interruption. After completing a step of one of tasks 120 in run list 104A, scheduler 100A invokes the next step for the next one of tasks 120 in the run list. In this way, scheduler 100A invoking different ones of tasks 120 performs time-division multiplexing by "step-slicing" the tasks. That is, in contradistinction to "time-slicing" tasks 120 such that each task is provided a short period of time by the kernel during which the task may execute until preempted, each of tasks 120 continues executing until the task has completed a step. Step-slicing thus ensures the atomicity of the steps of tasks 120.

Each of tasks 120 maintains a memory pointer, step index, or other reference to the next step for execution in the associated task. When scheduler 100A invokes a task, the task executes the next step and then sleeps to return control to scheduler 100A, which invokes the next task in run list 104A. For example, task 120K executes step $120C_2$ of task 120K and then returns control to scheduler 100A, which invokes task 120A. The task 120A then executes step $120A_3$. In some instances, a single execution thread executes each of tasks 120 using step-slicing techniques described above. The single execution thread may nevertheless sleep after each step, or after executing a step for tail task 120K of the run list, for example, to allow threads for non-run list tasks to execute.

Fine-grained schedulers 100 enable virtual processors 84 to execute multiple transactions of varying complexity and duration. In general, transactions may be characterized as modifying a database (e.g., SQL INSERT, DELETE, and UPDATE statements) or as querying the database (e.g., an SQL SELECT statement). These transactions may be further characterized according to their execution duration. For example, a transaction that updates a single row may be considered a short running transaction, while a transaction that queries the entire database and/or performs complex/extended calculations may be considered a long running transaction. As a still further example, a query transaction based on SELECT FUTURE (described below in further detail) may be considered a perpetually or "continuously" running transaction. Schedulers 100 may permit interleaving the execution, by virtual processors 84, of various combinations of short, long, and continuously running transactions. In combination with the ability to scale out beyond physical in-memory boundaries and to an arbitrary number of cores, the techniques may support rich and complex queries in workload mixes that include transactions of varying execution duration, particularly in the context of large numbers of transactions received from a large numbers of client connections.

Figure 7A:
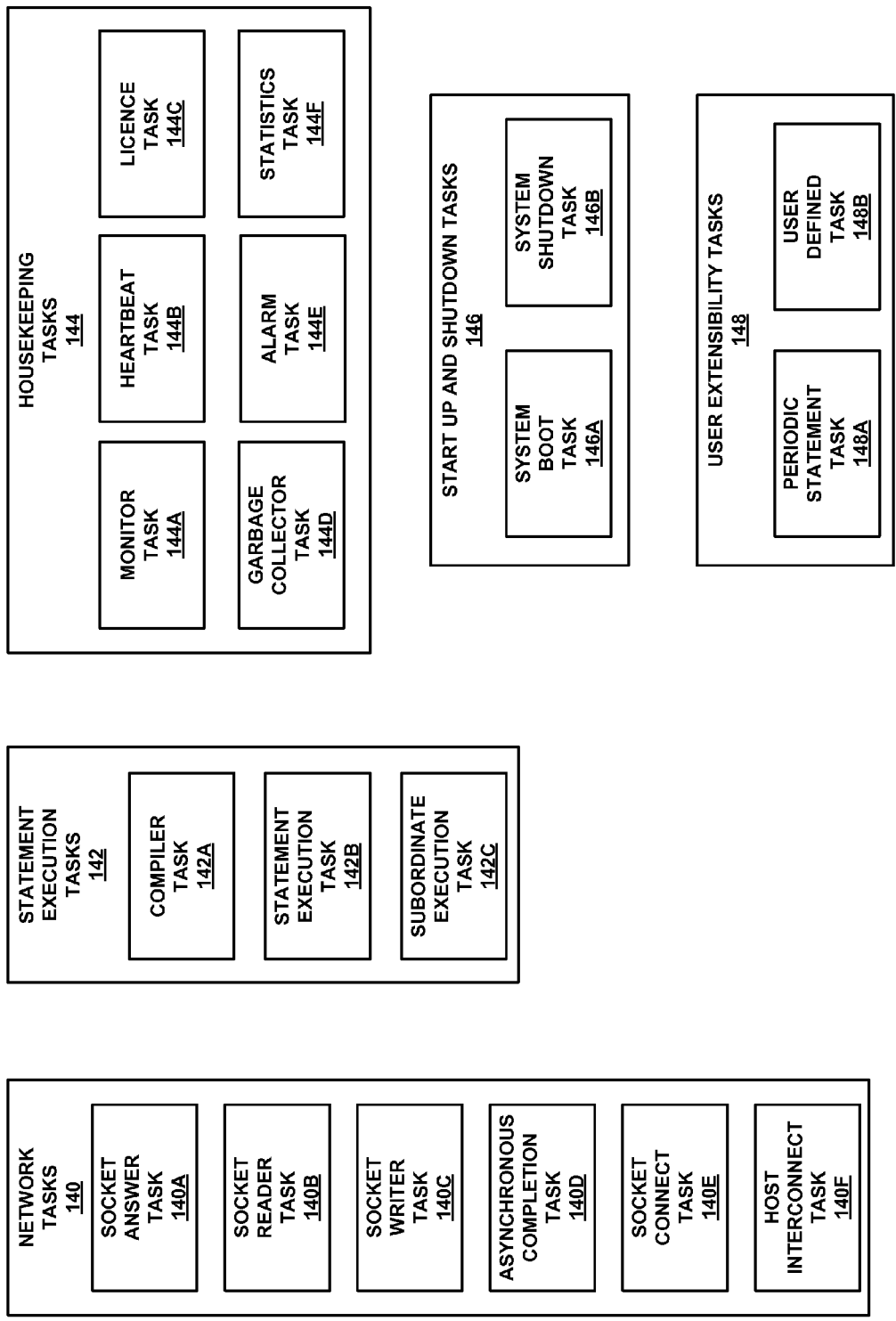
FIGS. 7A-7B are block diagrams illustrating example tasks that support the parallelized operation of the transactional data accelerators of FIG. 1.
Figure 7B:
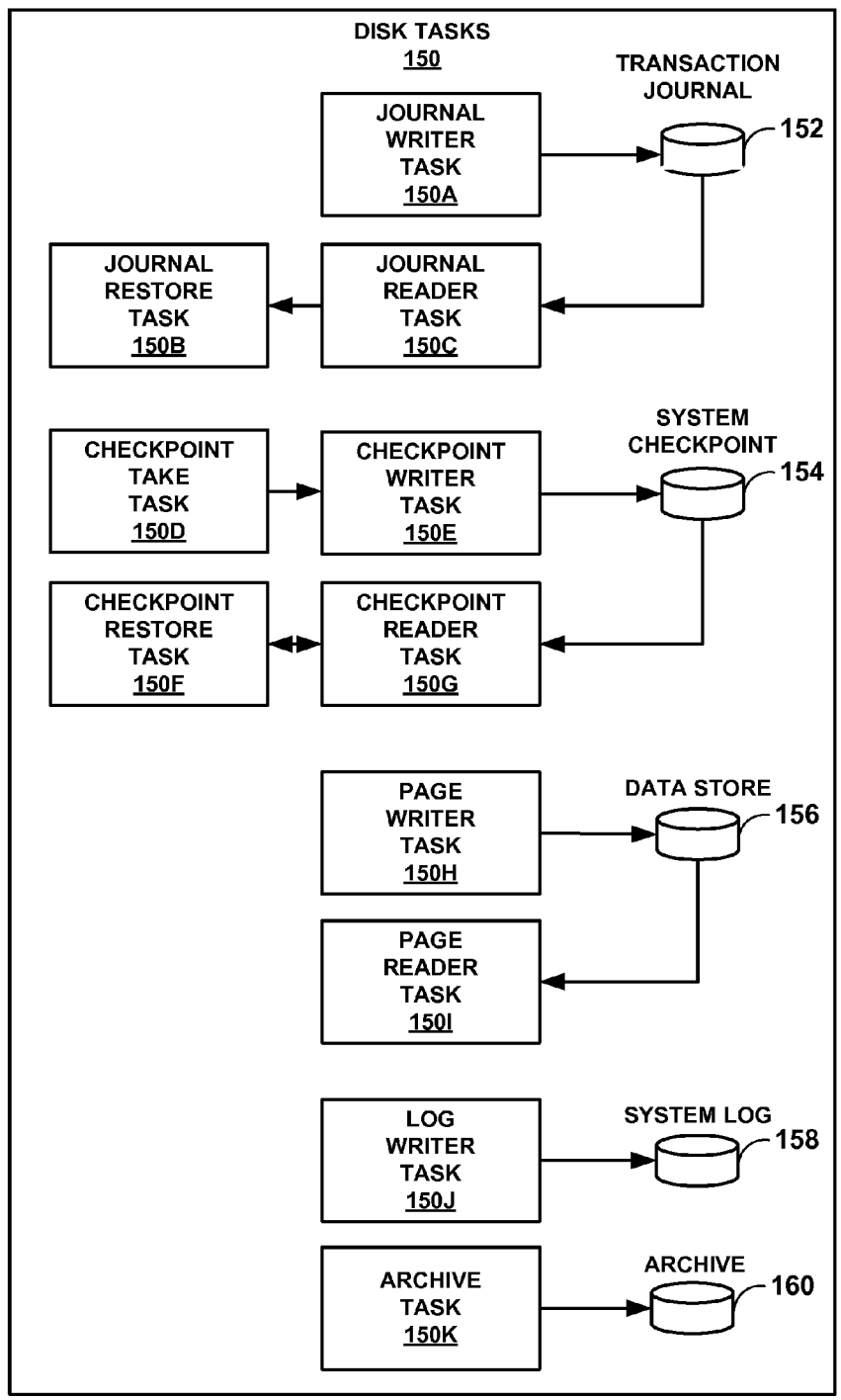

FIGS. 7A-7B are block diagrams illustrating example tasks that support the parallelized operation of transactional data accelerators 13 of FIG. 1. While tasks are illustrated as belonging to separate groups, e.g., network tasks 140, each of the tasks operates substantially independent from one another as described herein.

Network tasks 140 support interfacing with clients and additionally enable communication among multiple cluster machines that cooperate to implement one or more accelerator 13. In this example, sockets are the principal communication interface among cluster machines and between a transactional data accelerator and one or more clients. An instance of socket answer task 140A executing on standalone machine or a cluster machine listens for socket connection requests issued by clients to the system. Upon receiving a socket connection request, the socket answer task 140A spawns new instances of socket reader task 140B and socket writer task 140C specific to the socket connection request. The new socket reader task 140B and socket writer task 140C cooperate to complete the socket connection handshake and establish a socket connection. The new socket reader task 140B listens for service requests from the corresponding client. In this way, individual tasks that may be executed in parallel by multiple cores implement multiple, parallel connection points with the system. The techniques may therefore enable a single system to handle hundreds of thousands of concurrent connections.

Asynchronous completion task 140D supports socket reader tasks 140B and socket writer tasks 140C by enabling asynchronous socket send and receive operations and facilitating high-performance client request/response input/output (I/O). A system may spawn a new asynchronous completion task 140D for each socket connection. Cluster machines may interface with one another using network tasks 140. Host interconnect task 140F manages socket connections among virtual processor instances on two or more cluster machines of a cluster. An instance of host interconnect task 140F executes on each of the cluster machines to establish socket connections between virtual processor instances. Host interconnect task 140F may, for example, create a full mesh of continuously connected sockets among all virtual processors of the clusters that reside on separate cluster machines. Alternatively, host interconnect task 140F may establish connections between such virtual processors as needed to execute client requests and facilitate system efficiency. To establish a new socket connection, host interconnect task 140F in this example spawns a new instance of socket connect task 140E for the new socket connection, which in turn spawns new instances of socket writer task 140C and socket reader task 140B.

Statement execution tasks 142 include tasks that represent example embodiments of tasks described above with respect to FIG. 3. Specifically, compiler task 142A, statement execution task 142B, and subordinate execution task 142 may represent example embodiments of compiler task 44, execution task 46, and any of subordinate execution tasks 48, respectfully.

System boot task 146A initializes a system according to configurable parameters and manages loading at least a portion of in-memory relational database 27 from persistent storage. System shutdown task 146B stores system data, including data configured during operation of the system, to persistent storage for later restoration. In addition, system shutdown task 146B may manage writing at least a portion of in-memory relational database 27 to persistent storage.

Periodic statement task 148A may be configured to periodically execute an operation. For example, an instance of periodic statement task 148A may be configured to periodically delete, from a record table, previously executed statements saved to facilitate ACID-compliance. This example is a form of housekeeping that streamlines the system by removing superfluous data. User defined task 148B may be configured with user instructions to execute custom user applications with respect to in-memory relational database 27. In this way, customers have access to the internal execution model of the system, and techniques of this disclosure provide a highly extensible system to which customers can add custom tasks. The tasking model disclosed herein enable customers and developers to incrementally increase the sophistication of the system by simply adding additional tasks.

Parallelization engine 22 provides a range of internal services. This includes session management, transaction management, schema control, parallelized containers, locking, parsing, error management and dynamic machine code generation. These may be accessed by a toolkit or other application programming interface (API) to modify the operation of parallelization engine 22.

Housekeeping tasks 144 administer resources and administer the system. Garbage collector task 144D performs garbage collection to reclaim memory occupied by objects that are no longer referenced by any process within the system. Garbage collection task 144D is responsible for finally removing row field data from structures (e.g., indices) of in-memory relational database 27 and reclaiming the memory. Statement execution task 142B logically removes a row from the database in response to incoming delete statements. However, once a row has been marked as logically deleted, statement execution task 142B inserts a pointer to the deleted row into a list of rows to be removed/reclaimed by garbage collector task 144D. A garbage collector task(s) 144D applies the assignment algorithm to each row for each index of in-memory relational database 27 that references the row. Garbage collector task(s) 144D remove the row from each index it is in and then deletes the row structure, thereby reclaiming the memory the row occupied.

Heartbeat task 144B and alarm task 144E may represent an example embodiment of heartbeat tasks 102 of FIG. 5. Instances of alarm task 144E each manage a hardware timer and a sleep list of a virtual processor in accordance with techniques described with respect to FIG. 5. License task 144C ensures the system is operating with a valid license. Statistics task 144F measures performance and other metrics of the system and communicates the statistics via an instance of socket writer task 140C to a management entity. For example, an instance of statistics task 144F may time steps executed by threads, monitor the number of tasks in the system, monitor client request throughput or response time, and monitor a client request arrival rate. Monitor Task 144A periodically checks the status of all other tasks in the system to report errors/warnings and to facilitate error correction/handling.

Disk tasks 150 provide durability-compliance for in-memory relational database 27. Journal writer task 150A writes state for executed statements to transaction journal 152, a computer-readable storage device. Upon a transaction failure or other database-related operational failure, journal reader task 150C reads the written state for the previously executed statements, and journal restore task 150B restores, if necessary, the state to memory to restore the in-memory relational database 27 to a known state. An instance of periodic statement task 148A may periodically determine obsolete journal entries and delete such entries from transaction journal 152.

Checkpoint-related tasks persist and restore portions of in-memory relational database 27 to/from system checkpoint 154, a computer-readable storage device. Checkpoint take task 150D determines a portion of memory to write to disk and directs checkpoint writer task 150E to write the portion as a checkpoint to disk. On the event of a database-related failure, checkpoint restore task 150F determines one or portions of memory to restore from previously written checkpoints and directs checkpoint reader task 150G to read the checkpoints and reinsert the checkpoint data to appropriate memory locations. This enables journal reader task 150C to read and restore only those transactions applied after the checkpoint take task 150D stored the checkpoint to system checkpoint 154.

Page writer task 150H and page reader task 150I page in-memory data to secondary storage represented by data store 156, a computer-readable storage device, to scale-out memory utilized by in-memory relational database 27. Page writer task 150H identifies stale items (e.g., rows) of database objects within in-memory relational database 27 and, upon identifying stale items, write data for the stale items to data store 156. In addition, page writer task 150H subsequently deletes the stale items. When a task executing on the system requires access to items written to data store 156, page reader task 150I reads the items from the data store and inserts the data for the items, using transactions, to in-memory relational database 27.

Log writer task 150J logs system operations to system log 158, a computer-readable storage device. Archive tasks 150K identifies journal entries and/or checkpoints made obsolete by subsequent checkpoints and writes the data to tertiary storage represented by archive 160, a computer-readable storage device.

Figure 8:
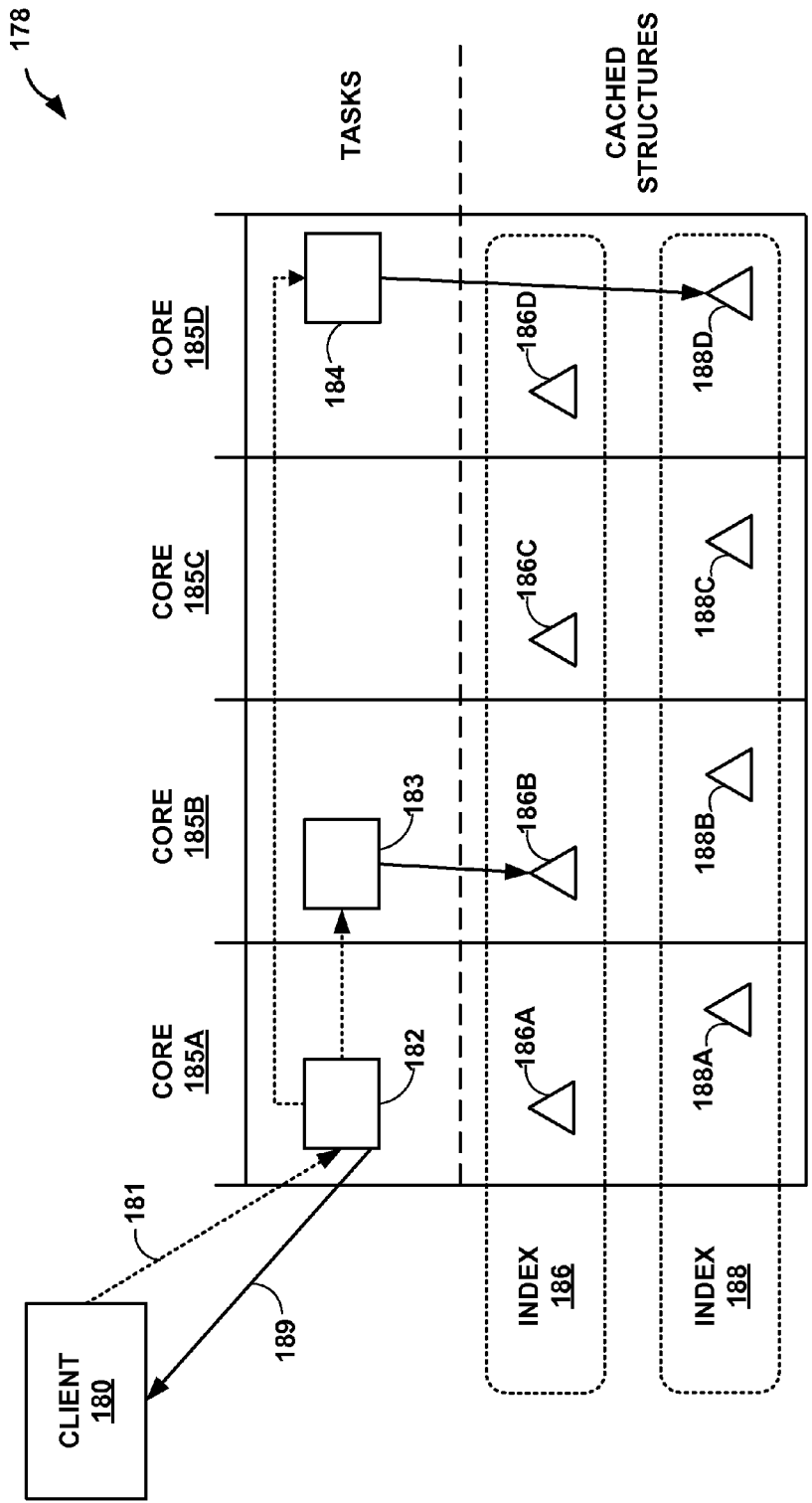
FIG. 8 is a block diagram illustrating an example transactional data accelerator that concurrently writes to multiple data objects in parallel in accordance with techniques described herein.

FIG. 8 is a block diagram illustrating an example transactional data accelerator 178 that writes to multiple data objects in parallel in accordance with techniques described herein. Transactional data accelerator 178 includes cores 185A-185D ("cores 185"). Indices 186, 188 are each an index for a different field of a table object (not shown) of in-memory relational database 27. For example, the table object may include two fields, EMPLOYEE_ID and EMPLOYEE_NAME each indexed by one of separate indices 186, 188. Each of partial indices 186A-186D partition and store partial data for index 186 in accordance with an assignment algorithm. Likewise, each of partial indices 188A-188D partition and store partial data for index 188 in accordance with the assignment algorithm.

Client 180 issues to transactional data accelerator 178 a request statement that references both fields on which indices 186, 188 are indexed. For example, the request statement may be an INSERT, DELETE, or UPDATE SQL statement to respectively insert, delete, or update a row into/of the table object on which the indices 186, 188 are based. As another example, the request statement may be a SELECT SQL statement to acquire all rows matching criteria that reference both fields on which indices 186, 188 are indexed. Thus, the techniques may permit parallelization of many different types of declarative language (e.g., SQL) operations for not only querying but also for modifying an in-memory database.

Statement execution task 182 receives, via a socket connect and a compiler task (neither shown in FIG. 8), transactions 181 that form an execution plan to execute the request statement from client 180. Transactions 181 include a first sub-transaction for index 186 and a second sub-transaction for index 188. Statement execution task 182 spawns subordinate execution tasks 183, 184 to execute the first and second sub-transactions of transactions 181.

For example, in the case of the INSERT SQL statement example, above, statement execution task 182 first creates and adds new row to the table object according to row data received in the request statement. Statement execution task 182 then performs an assignment algorithm using the field value of the row for the field on which index 186 is based and, based on the output of assignment algorithm, assigns the field value to core 185B. Statement execution task 182 spawns subordinate execution task 183 to core 185B and directs the spawned task to insert an index row for the new data to partial index 186B. Subordinate execution task 183 adds the index row to partial index 186B with a memory pointer to the new row added statement execution task 182 to the table object.

In addition, statement execution task 182 performs an assignment algorithm using the field value of the row for the field on which index 188 is based and, based on the output of assignment algorithm, assigns the field value to core 185D. Statement execution task 182 spawns subordinate execution task 184 to core 185D and directs the spawned task to insert an index row for the new data to partial index 188D. Subordinate execution task 184 adds the index row to partial index 188D with a memory pointer to the new row added statement execution task 182 to the table object. In this way, subordinate execution tasks 183, 184 may execute concurrently and insertion of new index rows to indices 186, 188 may occur in parallel, rather than serially. In some instances, transactions 181 may include sub-transactions that each cause tasks to write to partial indices 186. For example, transactions 181 may include sub-transactions to write to respective partial indices 186B, 186D. Nevertheless, subordinate execution tasks 183, 184 may execute concurrently to simultaneously modify partial indices 186B, 186D for the same database object, i.e., index 186. Subordinate execution tasks 183, 184 returns data and/or status information to statement execution task 182, which returns a result 189 to client 180 via a socket connect task (not shown in FIG. 8).

Figure 9:
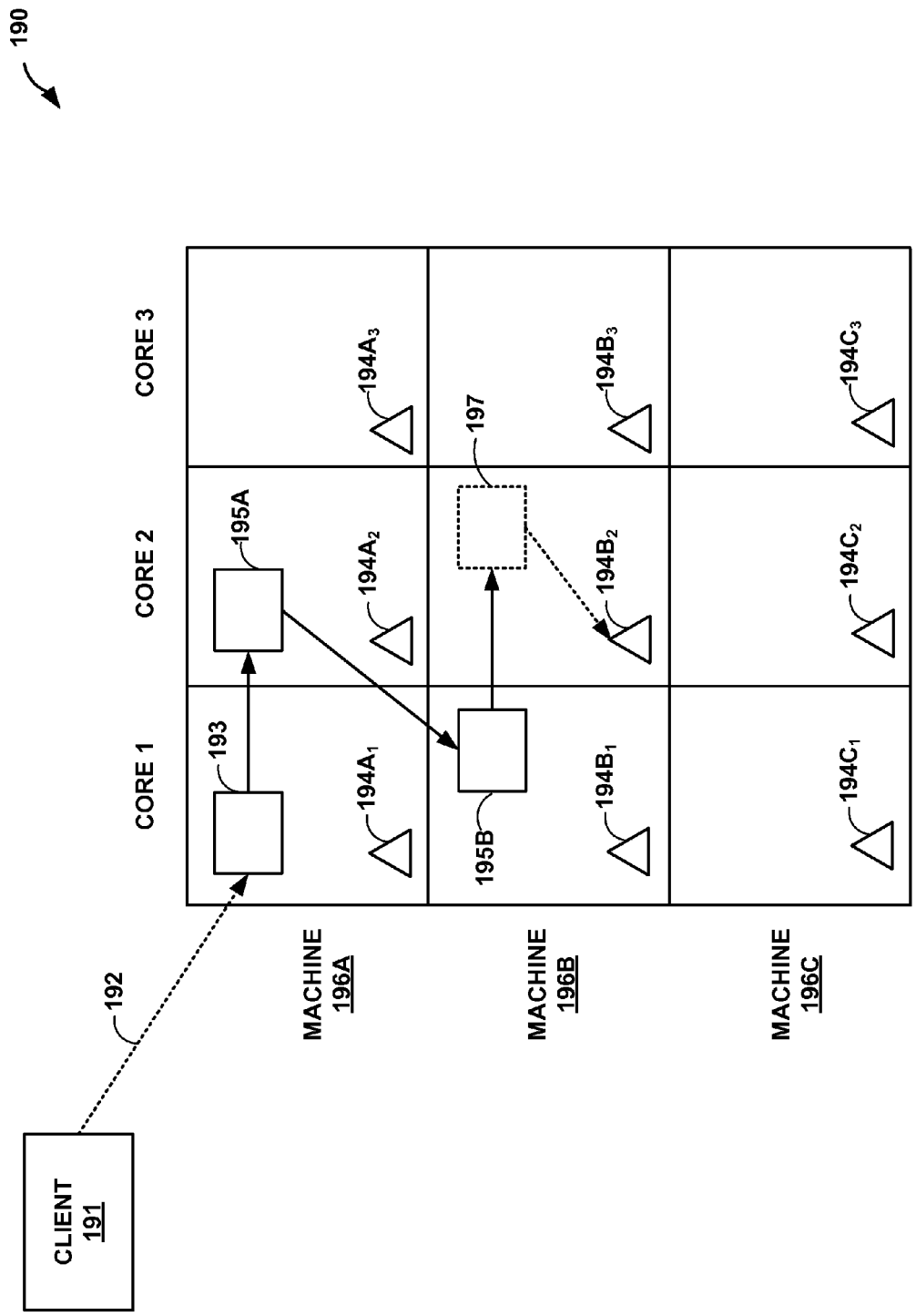
FIG. 9 is a block diagram illustrating an example transactional data accelerator 190 that includes multiple cluster machines to write to partial data structures in accordance with techniques described herein.

FIG. 9 is a block diagram illustrating an example transactional data accelerator 190 that includes cluster machines 196A-196C ("cluster machines 196") that present a unified interface to a client and write to partial data structures in accordance with techniques described herein. Each of cluster machines 196 includes a core 1, core 2, and core 3. For example, cluster machine 196A includes core 196A$_1$, 196A$_2$, and 196A$_3$. Cluster machines 196A, 196B execute respective socket connect tasks 195A, 195B with which to interface to communicate data and task information. Each core in machines 196 of transactional data accelerator 190 includes a partial data structure for data object 194 of in-memory relational database 27. For example, core 196A$_1$ includes partial structure 194A$_1$ and core 196B$_2$ includes partial structure 194B$_2$.

Client 191 issues to transactional data accelerator 190 a request statement that relates to data for data object 194. Statement execution task 193 receives, via a compiler task (not shown), transaction 192 that forms an execution plan to execute the request statement from client 191. Statement execution task 193 performs a clustered assignment algorithm, such as a cluster hash function, using the data for transaction 192. The clustered assignment algorithm outputs two indices, a first index in the machine dimension and a second index in the core dimension. Statement execution task 193 in this way uses the clustered assignment algorithm to deterministically identify an appropriate core of machines 196 to execute transaction 192.

In the illustrated example, the clustered assignment algorithm outputs machine index 2 and core 2 to indicate a task operating on core 196B$_2$ should execute transaction 192. Because statement execution task 193 executes on machine 196A which is not the same as machine 196B for core 196B$_2$, statement execution task 193 establishes a socket connection between machines 196A, 196B via respective socket connect tasks 195A, 195B. Statement execution task 193 then spawns subordinate execution task 196 using socket connect tasks 195, and subordinate execution task 196 executes transaction 192 on partial structure 194B$_2$ associated with core 196B$_2$. In some cases, subordinate execution task 196 may return a transaction 192 result to statement execution task 193 via socket connect tasks 195. Statement execution task 193 may spawn subordinate execution task 196 on machine 196B by, for example, serializing and sending the steps of the task via socket connect tasks 195. Socket connect tasks 195 thus act in this instance as a proxy for statement execution task 193.

Figure 10:
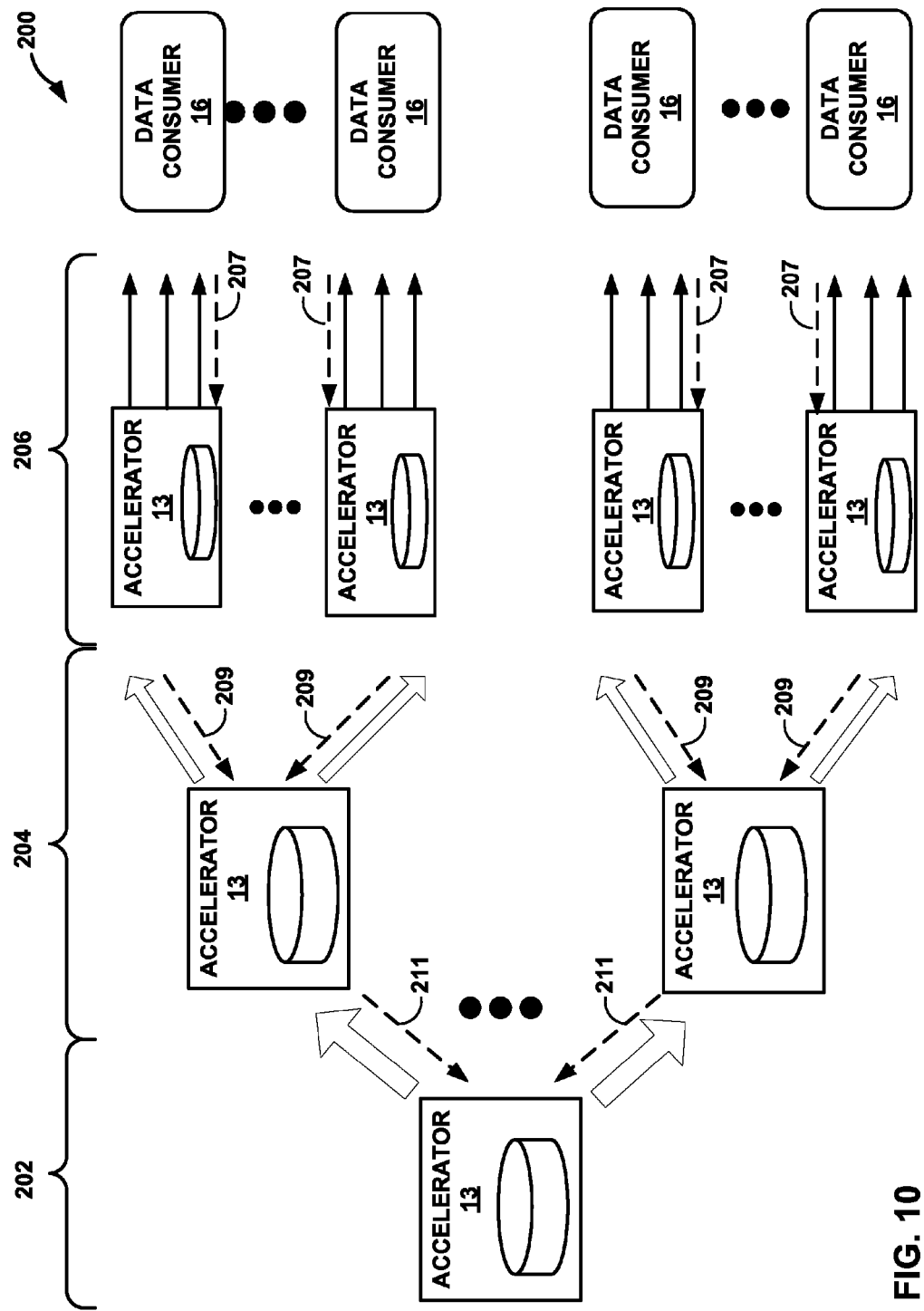
FIG. 10 illustrates an example system in which instances of transactional data accelerator that accords with techniques described herein are used as building blocks to form a tiered structure to interactively push selected data to a large number of individual clients (users) and create interactive private broadcast sessions (channels) within a homogenous mass broadcast data stream.

FIG. 10 illustrates an example system 200 in which instances of accelerator 13 are used as building blocks to form a tiered structure to interactively push selected data to a large number of individual clients (users) 201 and create interactive private broadcast sessions (channels) within a homogenous mass broadcast data stream.

In the example of FIG. 10, system 200 includes a plurality of transactional data accelerators 13 arranged in a three-tiered structure having core tier 202, fan-out tier 204 and edge tier 206. Data consumers 16, which may be on the order of millions device, each establish a unique query 207 with transactional data accelerators 13 of edge tier 206. In turn, transactional data accelerators 13 of edge tier 206 each establish queries 209 with transactional data accelerators 13 of fan-out tier 204. That is, data ingest engines 26 within transactional data accelerators 13 of edge tier 206 establish connections with content delivery engines 30 of transactional data accelerators 13 within fan-out tier 204 and provide aggregate queries 209 to the content delivery engines, where aggregate queries 209 are each an example of an aggregate transaction. That is, each content delivery engine 30 within transactional data accelerators 13 edge tier 206 computes an aggregate query 209 that represents all of data specified the client-specific queries received from data consumers 16. In other words, the aggregate query 209 computed by each content delivery engine 30 within fan-out tier 204 specifies a plurality of condition sets that correspond to the condition specified by data consumers 16 with which the content deliver engine has established connections.

In one example embodiment, database acceleration engine 30 of each accelerator 13 presents SQL-based API that has been enhanced to allow data consumers 16 to easily specify continuous queries. For example, in one embodiment the SQL-based API supports an optional future token to be included within any issued select statement to indicate that the query defined by the select statement is to be continuously applied to new, not yet received data. For example, a first data consumer 16 may issue a query as follows:
SELECT FUTURE stock_price, daily_volume FROM stock_table WHERE stock_symbol='IBM'
and a second data consumer may issue a query as follows:
SELECT FUTURE stock_price, daily_high FROM stock_table WHERE stock_symbol='GE'
In this case, both queries include the new keyword which causing the receiving database acceleration engine 30 indicate to treat the query as a continuous query rather than a one-time query. In this case, an aggregate query may be computed from the client-specific queries as: SELECT FUTURE stock_price, daily_volume, daily_high FROM stock_table WHERE stock_symbol='GE' or stock_symbol='IBM'.

In turn, data ingest engines 26 of transactional data accelerators 13 of fan-out tier 204 establish connections and provide aggregate queries 211 to content delivery engines 30 of accelerator 13 within core tier 202. Core tier 202 represents a cluster of one or more transactional data accelerators 13 that operate on a stream of transaction data, as described above, from one or more sources. If a data change occurs, the updated data is automatically pushed from core tier 202 to those data consumers 16 for which the updated data matches the conditions defined by the client's query 207. At each of tier, content delivery engines 30 fan the data out to the data ingest engines 26 for population of the massively parallel in-memory database as described herein until the updated is pushed to data consumers 16. The parallelization techniques described herein allow this process to be extremely fast. For example, millions of data consumers 16 can be supported using the example three tier structure of system 200 such that continuously changing data within core tier 202 can be pushed to data consumers 16 on the order of approximately one millisecond. This allows for processed data within core tier 202 to be 'pushed' (delivered) from in-memory database as a targeted data stream to data consumers 16. Although described with respect to three tiers, other tiers may be used. For example, example, with four tiers data could be pushed to billions of data consumers in a cost effective and timely manner.

Figure 11:
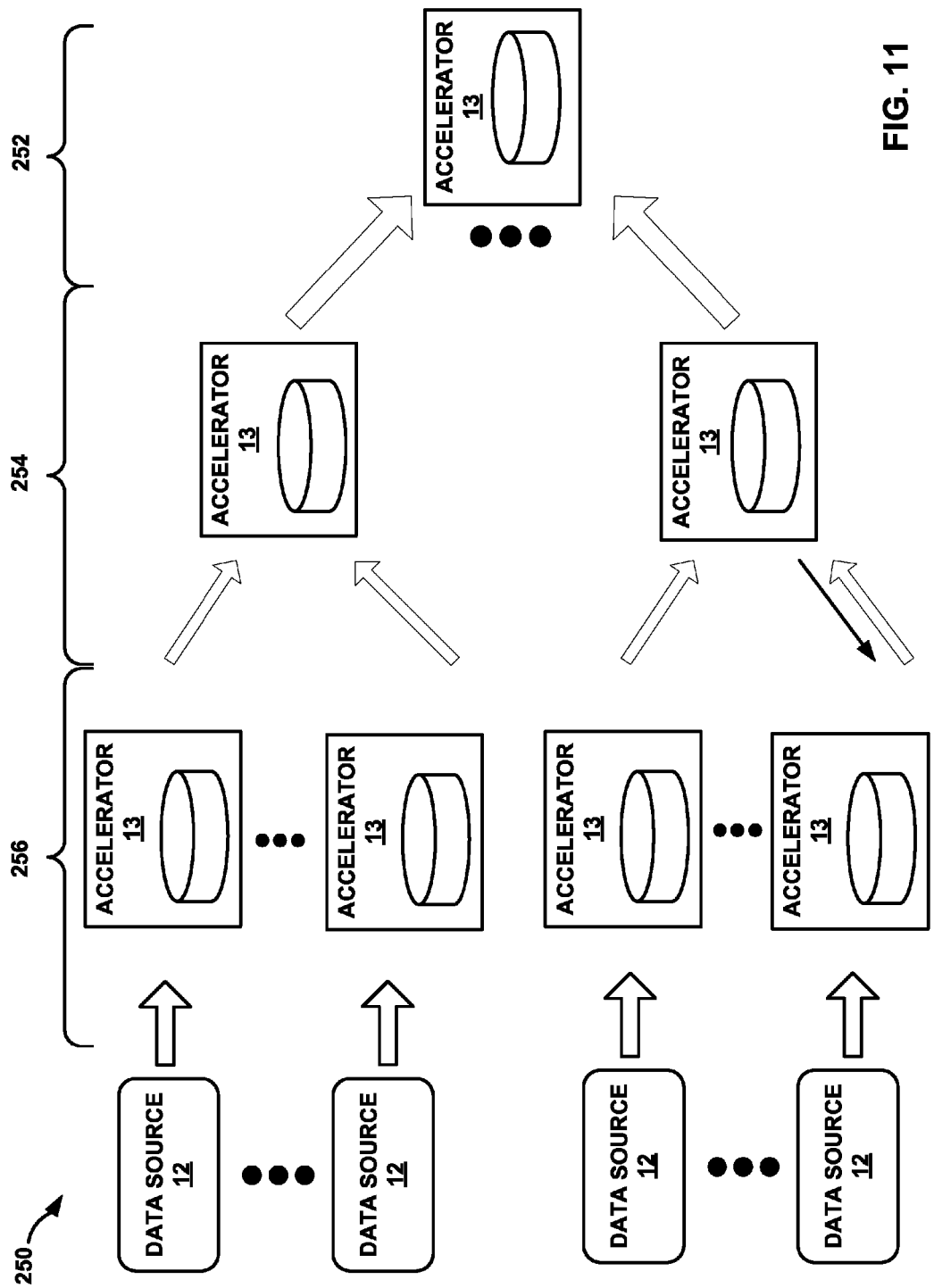
FIG. 11 illustrates an example system in which instances of a transactional data accelerator that accords with techniques described herein are used as building blocks to form a tiered structure to receive data from a large number of individual data sources (users).

FIG. 11 illustrates an example system 250 in which instances of accelerator 13 are used as building blocks to form a tiered structure to receive data from a large number of individual data sources (users) 251. Data sources 12 may be end-user computing devices (e.g., mobile devices), physical sensor (e.g., acoustic sensors for collecting data from shock waves or traffic control sensors for providing real-time data of traffic moving through a large metropolitan area) or any device that produces data. System 250 provides an elegant and cost efficient way to consume and process data from large numbers of data producers.

In the example of FIG. 11, system 250 includes a plurality of transactional data accelerators 13 arranged in a three-tiered structure having core tier 252, fan-in tier 254 and edge tier 256. Data sources 12, which may be on the order of millions of devices, each establish connections with and send transactional data to transactional data accelerators 13 of edge tier 256. In turn, transactional data accelerators 13 of edge tier 256 each establish connections with and send data to transactional data accelerators 13 of fan-in tier 254. That is, content delivery engines 30 within transactional data accelerators 13 of edge tier 206 establish connections with data ingest engines 26 of accelerator 13 within fan-in tier 254 and provide data to the data ingest engines 26. In turn, content delivery engines 30 of transactional data accelerators 13 of fan-in tier 254 establish connections and provide data to data ingest engines 26 of transactional data accelerators 13 within core tier 252. Core tier 252 represents a cluster of one or more transactional data accelerators 13 that operate on transaction data as described above. Core tier 252 may process and output the received data to data warehouses or interested clients using private broadcast channels as describe with respect to system 200 of FIG. 10.

Figure 12:
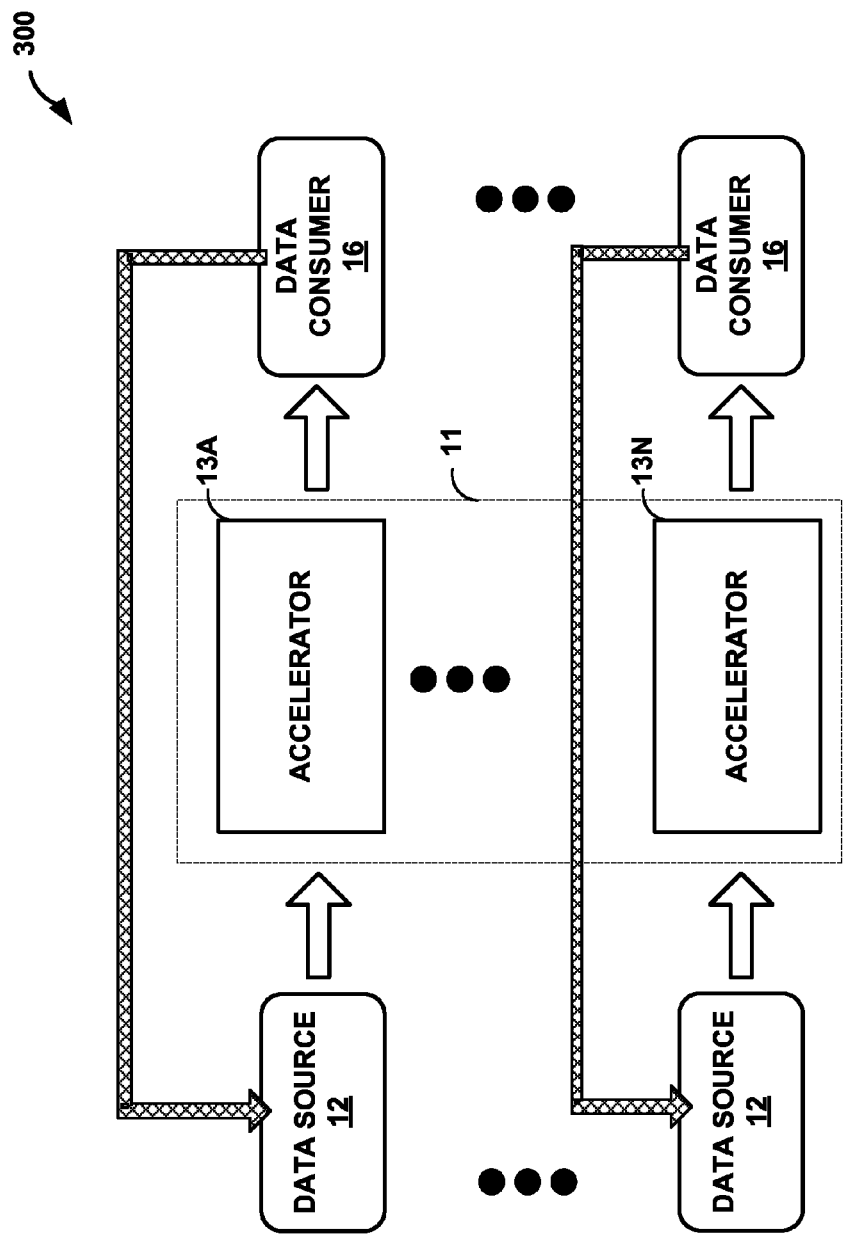
FIG. 12 is a block diagram illustrating an example system that utilizes the techniques described herein to provide high-performance transactional data acceleration for users that both source and consume data.

FIG. 12 is a block diagram illustrating an example system that utilizes the techniques described herein to provide high-performance transactional data acceleration. Like reference characters are used to denote like elements of FIG. 1. In the example system 300 of FIG. 12, as in the example system 10 of FIG. 1, a set of transactional data accelerators 13A-13N (collectively, "transactional data accelerators 13") are organized to form a cluster 11 of data accelerators. Transactional data accelerators operate to continuously ingest and process large amounts of data transactions from data sources 12 and deliver the processed data to data sources 16. Data sources 12 and data consumer 16 may be anything that source or consume data, such as systems, applications, or databases.

In this example, data consumers 16 respond to broadcast data delivered by transactional data accelerators 13. Responses to broadcast data from data consumers 16 represent data for data sources 12, which is ingested by transactional data accelerators 13, processed, and used to deliver refined, aggregated, or otherwise processed data to data consumers 16. While the operations of transactional data accelerators 13 may be substantially similar in both system 10 of FIG. 1 and system 300 of FIG. 12, system 300 involves a "feedback loop" of real-time (or near real-time) broadcast data and broadcast data responses and thus illustrates that the techniques of this disclosure, as implemented by transactional data accelerators 13, may apply to accelerate the interactive delivery of user-enabled query results and other interactive applications.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium or device, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

What is claimed is:

1. A device comprising:
a multi-core hardware processor having a plurality of execution cores;
an in-memory database comprising data stored within a plurality of memory partitions, wherein each of the memory partitions is associated with a different one of the execution cores;
a data ingest engine that establishes a plurality of concurrent network connections to external devices to receive incoming transactions; and
a parallelization engine that decomposes incoming transactions for the in-memory database into sub-transactions, deploys the sub-transactions to the execution cores associated with the respective memory partitions that store data for the sub-transactions, and concurrently executes the sub-transactions of the incoming transactions on the respective execution cores to which the sub-transactions are deployed, wherein the incoming transactions include a first transaction and a second transaction, wherein the first transaction and the second transaction include first data and second data, respectively, for insertion to the in-memory database,
wherein the parallelization engine comprises a first compiler task and a second compiler task that execute concurrently to decompose, respectively, the first transaction into a first set of sub-transactions and the second transaction into a second set of sub-transactions;
a first statement execution task that applies an assignment algorithm to the first data to identify a first one of the execution cores to execute one of the first set of sub-transactions; and
a second statement execution task that applies the assignment algorithm to the second data to identify a second one of the execution cores to execute one of the second set of sub-transactions,
wherein the one of the first set of sub-transactions and the one of the second set of sub-transactions execute concurrently on the first one of the execution cores and the second one of the execution cores, respectively.

2. The device of claim 1, further comprising: a plurality of virtual machines that each operate in accordance with a virtual instruction set, wherein each of the virtual machines executes on a different one of the execution cores,
wherein the first statement execution task executes on one of the virtual machines to spawn and deploy, for each of the first set of sub-transactions, a sub-execution task to execute the sub-transaction on the identified one of the execution cores for the sub-transaction.

3. The device of claim 2,
wherein each of the virtual machines comprises a scheduler for the corresponding execution core, and
wherein each of the schedulers maintains a separate run list data structure that stores a reference to tasks scheduled for execution by the corresponding one of the plurality of execution cores.

4. The device of claim 2,
wherein each of the virtual machines includes a cross-queue data structure that stores references to tasks migrated to the virtual machine by a scheduler of a different one of the virtual machines.

5. The device of claim 1,
wherein the first statement execution task spawns a sub-execution task for each of the first set of sub-transactions; and
wherein the second statement execution task spawns a sub-execution task for each of the second set of sub-transactions,
wherein the sub-execution task for each of the first set of sub-transactions and the sub-execution task for each of the second set of sub-transactions execute concurrently on different ones of the execution cores.

6. The device of claim 1, further comprising:
a content delivery engine that directs the parallelization engine to execute an aggregate transaction to aggregate respective data received in the incoming transactions,
wherein the content delivery engine outputs the data aggregated by the parallelization engine.

7. The device of claim 6, wherein the parallelization engine decomposes the aggregate transaction into aggregate sub-transactions, the device further comprising:
a plurality of virtual machines that each operate in accordance with a virtual instruction set, wherein each of the virtual machines executes on a different one of the execution cores,
wherein the first statement execution task executes on one of the virtual machines to apply the assignment algorithm to the aggregate sub-transactions to identify the execution cores associated with the respective memory partitions that store respective data for the aggregate sub-transactions,
wherein the first statement execution task spawns and deploys, for each of the aggregate sub-transactions, a sub-execution task to execute the aggregate sub-transaction on the identified one of the execution cores for the aggregate sub-transaction,
wherein the sub-execution task for each of the aggregate sub-transactions executes concurrently to retrieve the respective data for the aggregate sub-transactions, and
wherein the first statement execution task receives and aggregates the respective data and sends the aggregated data to the content delivery engine.

8. A method comprising:
establishing a plurality of concurrent network connections to external devices with a data ingest engine;
receiving incoming transactions with the data ingest engine by the concurrent network connections;
decomposing, with a parallelization engine executing on a multi-core hardware processor having a plurality of execution cores, incoming transactions for an in-memory database into sub-transactions, wherein the in-memory database comprises data stored within a plurality of memory partitions, wherein each of the memory partitions is associated with a different one of the execution cores;
deploying, with the parallelization engine, the sub-transactions to the execution cores associated with respective memory partitions that store data for the sub-transactions; and
concurrently executing the sub-transactions of the incoming transactions on the respective execution cores to which the sub-transactions are deployed, wherein the incoming transactions include a first transaction and a second transaction, wherein the first transaction and the second transaction include first data and second data, respectively, for insertion to the in-memory database;
concurrently executing a first compiler task and a second compiler task of the parallelization engine in parallel to decompose, respectively, the first transaction into a first set of sub-transactions and the second transaction into a second set of sub-transactions;

executing a first statement execution task that applies an assignment algorithm to the first data to identify a first one of the execution cores to execute one of the first set of sub-transactions;

executing a second statement execution task that applies the assignment algorithm to the second data to identify a second one of the execution cores to execute one of the second set of sub-transactions; and executing the one of the first set of sub-transactions and the one of the second set of sub-transactions concurrently on the first one of the execution cores and the second one of the execution cores, respectively.

9. The method of claim 8, further comprising:

executing a plurality of virtual machines that each operate in accordance with a virtual instruction set, wherein each of the virtual machines executes on a different one of a plurality of execution cores of the multi-core hardware processor, wherein the first statement execution task executes on one of the virtual machines to spawn and deploy, for each of the first set of sub-transactions, a sub-execution task to execute the sub-transaction on the identified one of the execution cores for the sub-transaction.

10. The method of claim 9, wherein each of the virtual machines comprises a scheduler for the corresponding execution core, and wherein each of the schedulers maintains a separate run list data structure that stores a reference to tasks scheduled for execution by the corresponding one of the plurality of execution cores.

11. The method of claim 10, wherein each of the virtual machines includes a cross-queue data structure that stores references to tasks migrated to the virtual machine by a scheduler of a different one of the virtual machines.

12. The method of claim 8, further comprising:

spawning, with the first statement execution task, a sub-execution task for each of the first set of sub-transactions; and spawning, with the second statement execution task, a sub-execution task for each of the second set of sub-transactions, wherein the sub-execution task for each of the first set of sub-transactions and the sub-execution task for each of the second set of sub-transactions execute concurrently on different ones of the execution cores.

13. The method of claim 8, further comprising:

directing, with a content delivery engine, the parallelization engine to execute an aggregate transaction to aggregate respective data received in the incoming transactions;

outputting, with the content delivery engine, the data aggregated by the parallelization engine.

14. The method of claim 13, wherein the parallelization engine decomposes the aggregate transaction into aggregate sub-transactions, the method further comprising:

executing a plurality of virtual machines that each operate in accordance with a virtual instruction set, wherein each of the virtual machines executes on a different one of a plurality of execution cores of the multi-core hardware processor;

executing the statement execution task on one of the virtual machines to apply an assignment algorithm to the aggregate sub-transactions to identify the execution cores associated with the respective memory partitions that store respective data for the aggregate sub-transactions, wherein the first statement execution task spawns and deploys, for each of the aggregate sub-transactions, a sub-execution task to execute the aggregate sub-transaction on the identified one of the execution cores for the aggregate sub-transaction, wherein the sub-execution task for each of the aggregate sub-transactions executes concurrently to retrieve the respective data for the aggregate sub-transactions, and wherein the first statement execution task receives and aggregates the respective data and sends the aggregated data to the content delivery engine.

15. A computer-readable storage media comprising instructions that, when executed, cause a multi-core hardware processor having a plurality of execution cores to:

establish a plurality of concurrent network connections to external devices with a data ingest engine;

receive incoming transactions with the data ingest engine by the concurrent network connections;

decompose, with a parallelization engine, incoming transactions for an in-memory database into sub-transactions, wherein the in-memory database comprises data stored within a plurality of memory partitions, wherein each of the memory partitions is associated with a different one of the execution cores;

deploy, with the parallelization engine, the sub-transactions to the execution cores associated with respective memory partitions that store data for the sub-transactions; and concurrently execute the sub-transactions of the incoming transactions on the respective execution cores to which the sub-transactions are deployed, wherein the incoming transactions include a first transaction and a second transaction, wherein the first transaction and the second transaction include first data and second data, respectively, for insertion to the in-memory database;

concurrently execute a first compiler task and a second compiler task of the parallelization engine to decompose, respectively, the first transaction into a first set of sub-transactions and the second transaction into a second set of sub-transactions;

execute a first statement execution task that applies an assignment algorithm to the first data to identify a first one of the execution cores to execute one of the first set of sub-transactions;

execute a second statement execution task that applies the assignment algorithm to the second data to identify a second one of the execution cores to execute one of the second set of sub-transactions; and execute the one of the first set of sub-transactions and the one of the second set of sub-transactions concurrently on the first one of the execution cores and the second one of the execution cores, respectively.

16. The computer-readable storage media of claim 15, wherein the instructions, when executed, further cause the multi-core hardware processor to: execute a plurality of virtual machines that each operate in accordance with a virtual instruction set, wherein each of the virtual machines executes on a different one of a plurality of execution cores of the multi-core hardware processor, wherein the first statement execution task executes on one of the virtual machines to spawn and deploy, for each of the first set of sub-transactions, a sub-execution task to execute the sub-transaction on the identified one of the execution cores for the sub-transaction.

* * * * *